(12) United States Patent
Kawase et al.

(10) Patent No.: US 10,919,149 B2
(45) Date of Patent: Feb. 16, 2021

(54) CONTROLLER FOR ROBOT AND INVERSE TRANSFORMING METHOD FOR ROBOT

(71) Applicant: DENSO WAVE INCORPORATED, Chita-gun (JP)

(72) Inventors: Daisuke Kawase, Chita-gun (JP); Yuto Kawachi, Chita-gun (JP); Masanori Sato, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 207 days.

(21) Appl. No.: 16/196,751

(22) Filed: Nov. 20, 2018

(65) Prior Publication Data

US 2019/0275673 A1 Sep. 12, 2019

(30) Foreign Application Priority Data

Nov. 24, 2017 (JP) ............................. JP2017-225909
Nov. 24, 2017 (JP) ............................. JP2017-225910
Nov. 24, 2017 (JP) ............................. JP2017-225911

(51) Int. Cl.
*B25J 9/16* (2006.01)
*B25J 9/06* (2006.01)
(Continued)

(52) U.S. Cl.
CPC ............... *B25J 9/1607* (2013.01); *B25J 9/06* (2013.01); *B25J 9/106* (2013.01); *B25J 9/16* (2013.01); *B25J 9/1664* (2013.01); *B25J 13/00* (2013.01)

(58) Field of Classification Search
CPC .................. B25J 9/16; B25J 9/06; B25J 9/10
See application file for complete search history.

(56) References Cited

U.S. PATENT DOCUMENTS

2002/0050988 A1* 5/2002 Petrov ..................... G06K 9/20
345/418
2011/0093119 A1 4/2011 Park et al.
(Continued)

FOREIGN PATENT DOCUMENTS

JP 2017-061022 A 3/2017

OTHER PUBLICATIONS

Shi, Qun et al. "A research on inverse kinematics solution of 6-DOF robot with offset-wrist based on Adaboost Neural Network". IEEE 8th International Conference on CIS & RAM, pp. 370-375, 2017.

*Primary Examiner* — Kira Nguyen
(74) *Attorney, Agent, or Firm* — Oliff PLC

(57) ABSTRACT

A robot has a vertical 6-axis articulated arm having an offset arm having a fifth axis and length link, and mutually linking fourth and sixth axes. The fourth and sixth axes shaft centers are parallel. The articulated arm has a head portion designated as a control point. A position and an orientation targeted to the control point is processed by an inverse transform to calculate angles of the axes. A provisional target position of the sixth axis is obtained by subtracting the link length from a target position of the sixth axis. The link length to the provisional target position is given zero to perform the inverse transform process. Processed results are evaluated. Until a difference between a calculated sixth-axis angles and provisionally decided sixth-axis angles becomes equal to or less than a predetermined value, processes started from the angle provisional decision of the sixth axis are repeatedly performed.

22 Claims, 13 Drawing Sheets

(51) Int. Cl.
*B25J 9/10* (2006.01)
*B25J 13/00* (2006.01)

(56) References Cited

U.S. PATENT DOCUMENTS

| | | | |
|---|---|---|---|
| 2011/0106308 A1* | 5/2011 | Eliasson | B25J 9/1664 700/250 |
| 2015/0045954 A1* | 2/2015 | Negishi | B25J 9/06 700/262 |
| 2019/0184560 A1* | 6/2019 | Liu | B25J 9/1664 |

* cited by examiner

CONTROLLER FOR ROBOT AND INVERSE TRANSFORMING METHOD FOR ROBOT

CROSS-REFERENCE TO RELATED APPLICATIONS

This application is based on and claims the benefit of priority from earlier Japanese Patent Applications No. 2017-225909 filed Nov. 24, 2017; No. 2017-225910 filed Nov. 24, 2017; and No. 2017-225911 filed Nov. 24, 2017, the descriptions of which are incorporated herein by reference.

BACKGROUND

Technical Field

The present invention relates to a controller controlling operations of a robot, such as an industrial robot, which has an offset arm connecting the fourth and sixth axes of the robot and a method of inverse-transforming the position of an end effector of the robot.

Related Art

A generally used vertical 6-axis type robot arm is provided with the fourth to sixth axes whose axial centers cross at a one point to each other.

In this robot arm, the fifth axis is rotated to displace the wrist portion including the sixth axis, which will cause a gap in a portion holding the wrist in the arm end portion. Such a gap may accidentally hold foreign matter. With consideration of such a case, by way of example, a Japanese design patent No. 1583755 is provided, in which an industrial robot has an offset arm mutually linking the fourth and sixth axes, whereby there is no gap in the portion holding the wrist. In this structure, the offset arm avoids the axial centers of both of the fourth and sixth axes from crossing to each other and permits both axial centers to be parallel with each other.

In this kind of arm structure, if it is assumed to perform an inverse-transform process in order to obtain the angles of the respective axes based on the position and orientation of the end effector, the conventional technique cannot be applied. One example of such inverse-transform processes is provided by PTL 1, in which it is possible to perform the inverse-transform process based on DH parameters even if robot assembling is associated with errors. In the technique disclosed in PTL 1, when an offset arm has a length of d5, a minute region corresponding to the errors is assumed and linearized on an assumption of d5=0, so that the convergence calculation is carried out.

PRIOR ART REFERENCE

Parent Literature

[PTL 1] JP-A 2017-61022

When assuming that the technique disclosed in PTL 1 is applied to the robot having d5≠0, the value of d5, which is an initial error in convergence calculation, becomes larger, which results in a large number of repetition times of the calculation or a possibility of divergence in the calculation without convergence. In addition, since there is an offset component, the offset component cannot be reflected correctly in a range even originally reached by the arm, which may be erroneously detected as not being within the reach.

SUMMARY

With consideration of the foregoing situations, it is desired to a a robot controller and an inverse transform processing method for robots, in which an inverse transform process can be performed even when the robot is equipped with an offset arm.

In a first exemplary embodiment, a controller is applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes.

In this configuration, an angular provisional deciding provisionally decides an angle of a sixth angle, a direction calculating unit calculates a direction of the offset arm based on the provisionally decided angle of the sixth axis, and a provisional target position calculating unit calculates a provisional target position which is subtracted from a target position of the sixth axis by the link length d5. An inverse transform processing unit applies an inverse transform process to the provisional target position in a state where the link length d5 is set to 0. Then an estimation unit repeats the processes starting from the provisional decision performed by the angular provisional deciding unit until a difference between an angle of the sixth axis, which is obtained by estimating a result from the inverse transform process based on an estimation function, and the provisionally decided angle of the sixth axis becomes equal to or less than a predetermined value.

According to this configuration, provisionally setting the angle of the sixth axis makes it possible that a robot, such as an industrial robot equipped with an offset arm whose link length is d5 and which connects the fourth and sixth axes, can be subjected to the inverse transform process.

In a second exemplary embodiment, a controller can be targeted to a robot equipped with a vertical articulated 6-axis arm having the foregoing arm structure.

In the control performed by the controller, by way of example, a position provisional deciding unit provisionally decides a position P6' of the sixth axis and provisionally decides a position P5' of the fifth axis based on the provisionally decided position P6'. A motion range determining unit determines whether or not the provisionally decided positions P5' and P6' are within a motion range defined based on link parameters of the robot. An inverse transform processing unit performs an inverse transform process of a homogeneous transformation matrix based on the positions P5' and P6' in a case where the provisionally decided positions P5' and P6' are within the motion range, the inverse transform process being performed under a condition of the link length d5=0. A forward transform processing unit performs a forward transform process based on angles of the respective axes obtained by the inverse transform process.

In addition, an evaluation value calculating unit calculates a position matrix $p_E$ of a difference between a target position of the control point and a position resulting from the forward transform process, and calculate a rotation matrix $R_E$ by multiplying a rotation matrix corresponding to the target position, by an inverse matrix of the rotation matrix resulting from the forward transform process. A calculation repeating unit repeatedly calculates processes starting from the inverse transform process, based on a homogeneous transformation matrix in which the position matrix $p_E$ and the rotation matrix $R_E$ are reflected, when the position matrix $p_E$ has a norm exceeding a threshold thereof or the rotation matrix $R_E$ has an angle exceeding a threshold thereof.

That is, in cases where the norm of the position becomes equal to or less than the threshold thereof and the angle calculated on the rotation matrix $R_E$ becomes equal to or less than the threshold, the inverse transform process will be ended. Accordingly, in a robot equipped with an offset arm having a link length d5 and connecting the fourth and sixth axes, the inverse transform process can be performed by provisionally setting the angle of the sixth axis. Results from this inverse transform process are then subjected to a forward transform process to gain both a matrix $p_E$ and a matrix $R_E$. These matrixes are then evaluated and, using evaluated results, calculated to be converged in the calculation, so that the inverse transform process can be used for obtaining the axis angles.

The controller according to the second exemplary embodiment can also be applied to a robot controller according to a third embodiment. Practically, a position provisional deciding unit provisionally decides a position P6' of the sixth axis and provisionally decides a position P5' of the fifth axis based on the provisionally decided position P6'. A motion range determining unit determined whether or not the provisionally decided positions P5' and P6' are within a motion range defined based on link parameters of the robot. Then, an inverse transform processing unit performs an inverse transform process of a homogeneous transformation matrix based on the positions P5' and P6' in a case where the provisionally decided positions P5' and P6' are within the motion range, the inverse transform process being performed under a condition of the link length d5=0. Moreover, a forward transform processing unit performs a forward transform process based on angles of the respective axes obtained by the inverse transform process.

Further, an evaluation value calculating unit calculates a position matrix $p_E$ of a difference between a target position of the control point and a position resulting from the forward transform process, and calculates a rotation matrix $R_E$ by multiplying a rotation matrix corresponding to the target position, by an inverse matrix of the rotation matrix resulting from the forward transform process. A calculation repeating unit calculates a rotation axis vector $q_E$ of the rotation matrix $R_E$ when the position matrix $p_E$ has a norm $\|p_E\|$ exceeding a threshold thereof or the rotation matrix RE provides an angle $\|R_E\|$ exceeding a threshold thereof. The calculation repeating unit also calculates a rotation vector $r_E$ defined as a product between the angle $\|R_E\|$ and a unit rotation axis vector $q_E/\|q_E\|$. Moreover, the calculation repeating unit updates the angles of the respective axes based on results obtained by multiplying a position matrix $P_E$ defined by the position matrix $p_E$ and the rotation vector $r_E$, by an inverse matrix of the Jacobian matrix obtained from the angels of the respective axes calculated by the inverse transform process. The processes starting from the forward transform process is repeated.

In this configuration of a robot having an offset arm to link the fourth and sixth axes to each other and configured to have a link length d5, it is also possible to perform the inverse transform process by provisionally setting the angle of the sixth axis, performing the inverse transform process, and reportedly estimating/calculating a matrix $p_E$ and a matrix $R_E$, which are obtained from transform-processed results by the forward transform process, such that the evaluation calculation can be converged.

The processes performed by the controllers according to the foregoing exemplary embodiments can also be practiced in the form of an inverse transform processing, thus providing the similar or equivalent advantageous operations to those described.

DETAILED DESCRIPTION OF THE PREFERRED EMBODIMENTS

Hereinafter, with reference to the accompanied drawings, robot control apparatuses and inverse transform processes for robot control will now be explained according to various types of embodiments.

First Embodiment

With reference to FIGS. 1 to 9, a first embodiment will now be described.

Figure 1:
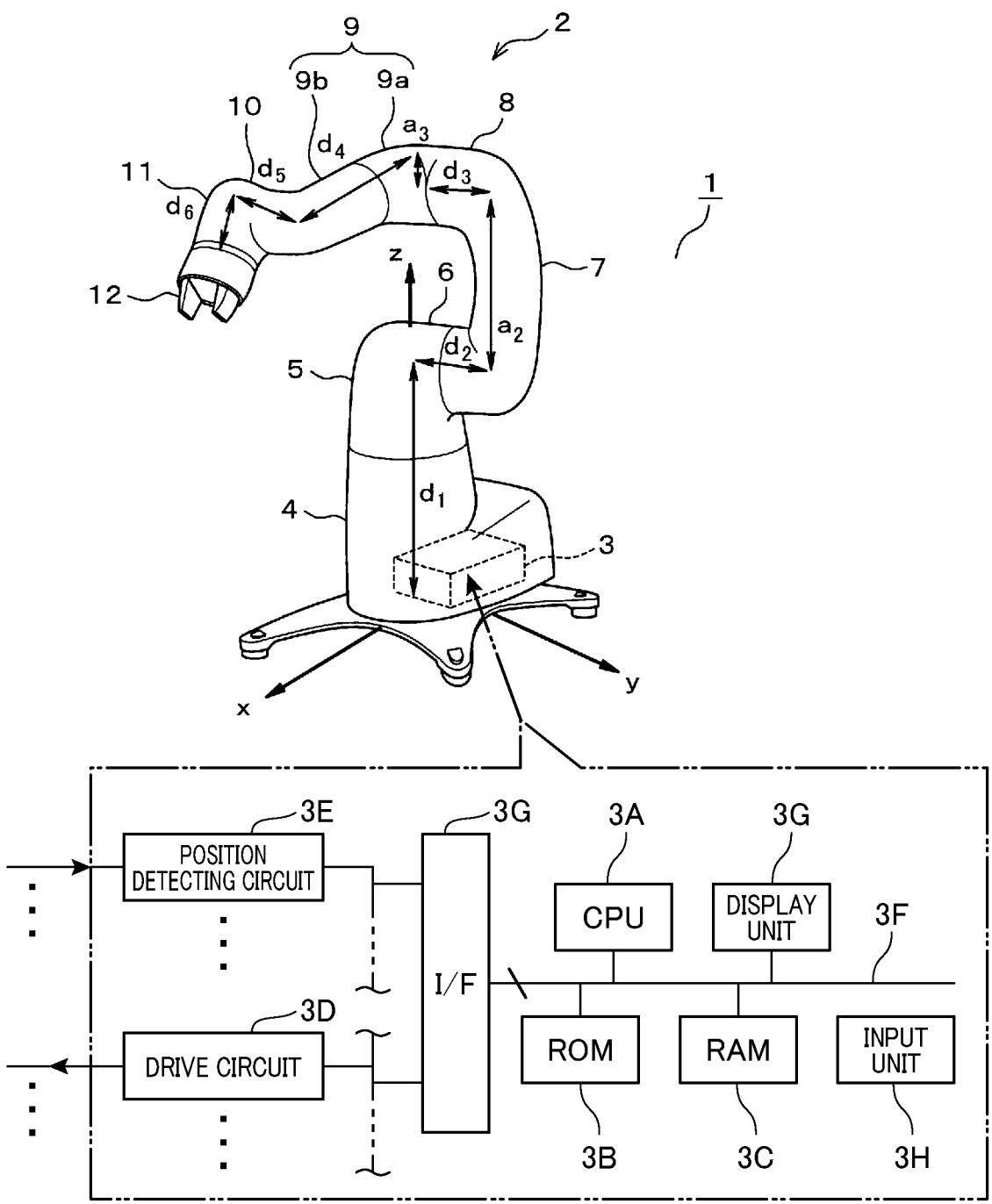
FIG. 1 is a diagram showing the configuration of a robot system according to a first embodiment.

As shown in FIG. 1, a robot system 1 is provided with a vertical articulated robot 2, a controller for controlling the robot 2, and a base 4 in which the controller 3 is incorporated. This robot system 1 is provided for general industrial use. The robot 2 is a 6-axis vertical articulated robot.

Figure 12:
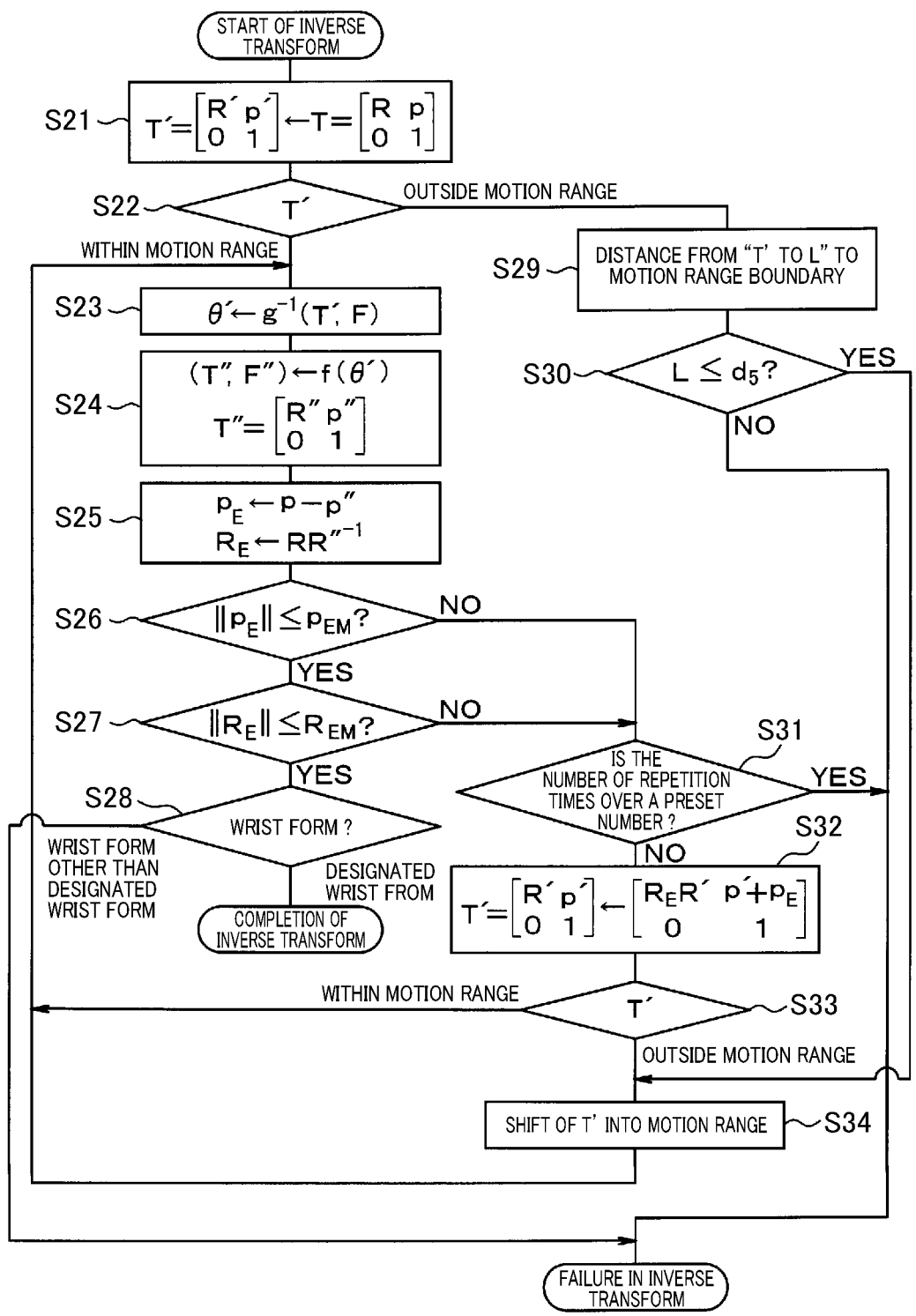
FIG. 12 is a flowchart explaining an inverse transform process performed by a controller in a fourth embodiment.

On the base 4, there is provided a first axis J1 having a z-directional shaft center, via which a shoulder 5 is rotatably coupled with the base 4 in a horizontal direction. The shoulder 5 has a second axis J2 having a y-directional shaft center, and is coupled with a second offset arm 6 extending in the y direction. Via this second offset arm 6, a lower part of a first arm 7 extending upward is coupled with the shoulder 5 and rotatable in the vertical direction. The first arm 7 has a head portion provided with a third axis J3 having a y-directional shaft center, and a second arm 9 is coupled with the head portion of the first arm 7 via a third offset arm 8 extending in the −y direction and is and rotatable in the vertical direction. The second arm 9 is composed of a base portion 9a and a head portion 9b The second arm 9 has a fourth axis J4 having an x-directional shaft center, in which the head portion 9b is twistably coupled with the base portion 9a. The head portion 9b of the second arm 9 is provided with a fifth axis J5 having a y-directional shaft center, and a wrist 11 is coupled with the head portion 9b via a fifth offset arm 10 extending in the −y direction and is rotatable in the vertical direction. The wrist 11 is twistably coupled with a flange and hand 12, as shown in FIG. 12, via a sixth axis J6 having the x-directional shaft center. At the respective axes J1 to J6 of the robot 2, an electric motor (not shown) is provided which serves as a drive source.

The controller 3 is a device for controlling the motions of the robot 2 and is provided with a computer including a CPU, a ROM and a RAM. The computer thus acts as control means which perform computer programs to control the motions of the robot 2. Practically, the controller 3 is also provided with drive units including inverter circuits. By this configuration, an encoder, which is arranged for each of the motors located at the axes J1 to J6, detects a motor rotating position, and based on this detection, drive of the motor at each axis is controlled by, for example, feedback control.

Practically, the controller includes the CPU (central processing unit) 3A, a ROM (read-only memory) 3B, a RAM (random access memory) 3C, drive circuits 3D, position detecting circuits 3E, and other circuit components, all of which are necessary for conducing motion control of the robot and an inverse transform process method for the robot control. These computer components are communicably connected to each other via an internal bus 3F and connected to the drive circuits 3D and the position detecting circuits 3E via an interface 3G. In the present embodiment, a display unit 3G and an input unit 3H are connected to the internal bus 3F. These components are known, except for an inverse transform process performed by the CPU 3A.

The ROM 3B is provided to previously store therein system programs and operation programs for the robot 2. The RAM 3B is provided to temporarily store therein parameter values and other information data which are necessary for performance of the various programs. In the controller 4, the CPU performs programs stored in the ROM 3B, which enables the controller 3 to functionally act as and correspond to an angle provisional deciding unit, a direction calculating unit, a provisional target position calculating unit, an inverse transform process unit, an estimation unit, and a form deciding unit. The position detecting circuits 3E receive signals detected by the encoders (not shown) arranged at the joints of the robot 2 and, based on the signals detected the encoders, detects rotational angular positions of the motors arranged at the joints. The drive circuits 3D drive the motors at the respective axes J1 to J6, under the control of the controller 3.

The controller 3 (precisely, the CPU 3A) executes an operating program which is previously set, whereby the controller 3 controls the positions and orientations of control points given at the arm head portions based on position information provided from the position detecting circuits 3E.

In the present embodiment, the controller 3 performs CP (Continuous Path) control. During the CP control, positions and orientations which are to be targeted of control points at the arm head portions, which correspond to motion trajectories, are set as functions of time when making the control points move to their targets. The positions and orientations to be targeted includes not only positions and orientations which are taught but also positions and orientations interpolated based on the taught positions and orientations. Via performance of the CP control, the controller 3 controls angles of the respective joints of the arms such that the positions and orientations of the control points change along the motion trajectories. In the control of the positions and orientations, the controller 3 is configured to perform an inverse transform process which calculates the angles of the first to sixth axes in order to realize positions and orientations which are now commanded as their targets.

Figure 2:
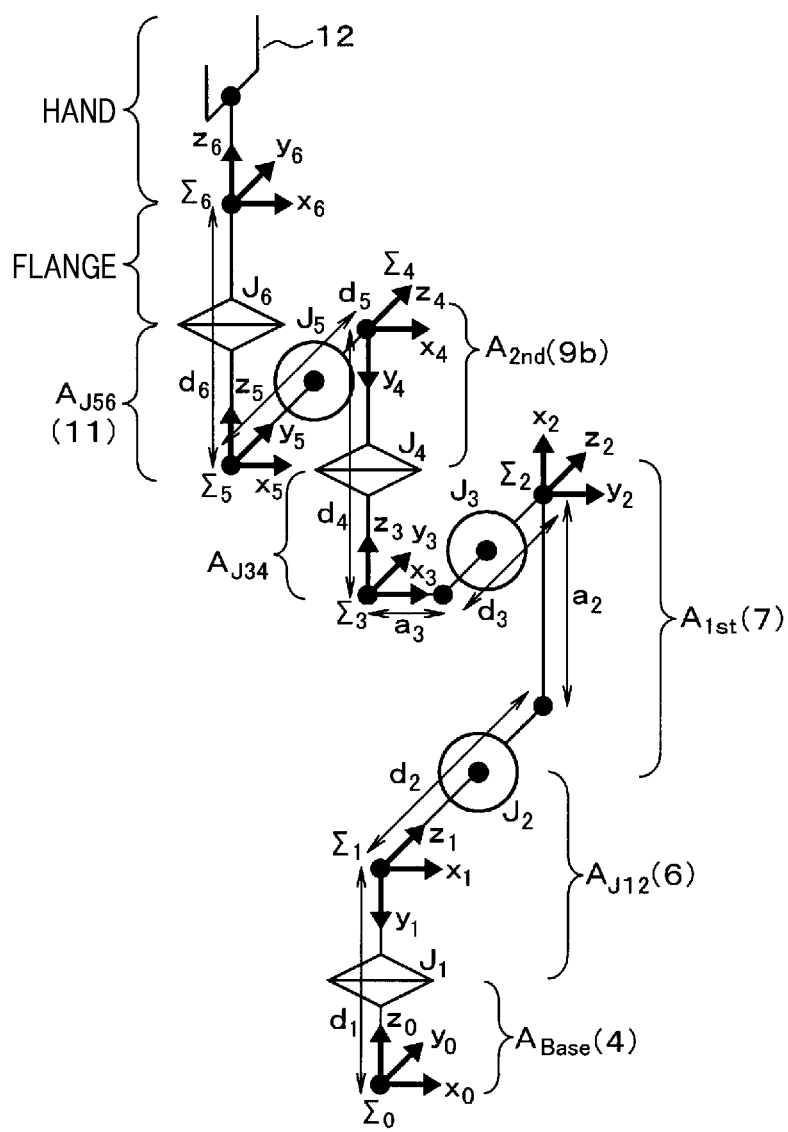
FIG. 2 is a diagram showing a robot coordinate system.

As shown in FIG. 2, the respective joints of the robot 2 have first to sixth coordinate systems $\Sigma_1$ to $\Sigma_6$ which are defined as three-dimensional orthogonal coordinate systems. Each of the coordinate systems $\Sigma_1$ to $\Sigma_6$ has an origin which is set at a predetermined position on each of the first to sixth axial lines J1 to J6. The respective coordinate systems $\Sigma_1$ to $\Sigma_6$ have z axes consisting of z1 to z6 axes, which are spatially in accord with the first to sixth axial lines J1 to J6.

At the base 4, there is defined a robot coordinate system which is the 0-th coordinate system $\Sigma_0$. This 0-th coordinate system $\Sigma_0$ does not change when the first to sixth axes rotate. In the present embodiment, the origin of the coordinate system $\Sigma_0$ is placed on the first axial line J1. The coordinate system $\Sigma_0$ has a z axis which is indicted as a z0 axis, which is specially in accord with the first axial line J1.

The reference symbols d1 to d6 and a2, a3 shown in FIG. 2 are defined as follows:

d1: a link length from the origin of the 0-th coordinate system $\Sigma_0$ to the origin of the first coordinate system $\Sigma_1$, d2: a link length from the origin of the first coordinate system $\Sigma_1$ to the base portion of the first arm 7, a2: a link length from the base portion of the first arm 7 to the head portion thereof, i.e., the origin of the second coordinate system $\Sigma_2$, d3: a link length from the origin of the second coordinate system $\Sigma_2$ to the head portion of the third offset arm 8, a3: a distance between the shaft centers of the third and fourth axes J3 and J4, d4: a link length from the origin of the third coordinate system $\Sigma_3$ to the origin of the fourth coordinate system $\Sigma_4$, d5: a link length from the origin of the fourth coordinate system $\Sigma_4$ to the origin of the fifth coordinate system $\Sigma_5$, and d6: a link length from the origin of the fifth coordinate system $\Sigma_5$ to the origin of the sixth coordinate system $\Sigma_6$.

Figure 3:
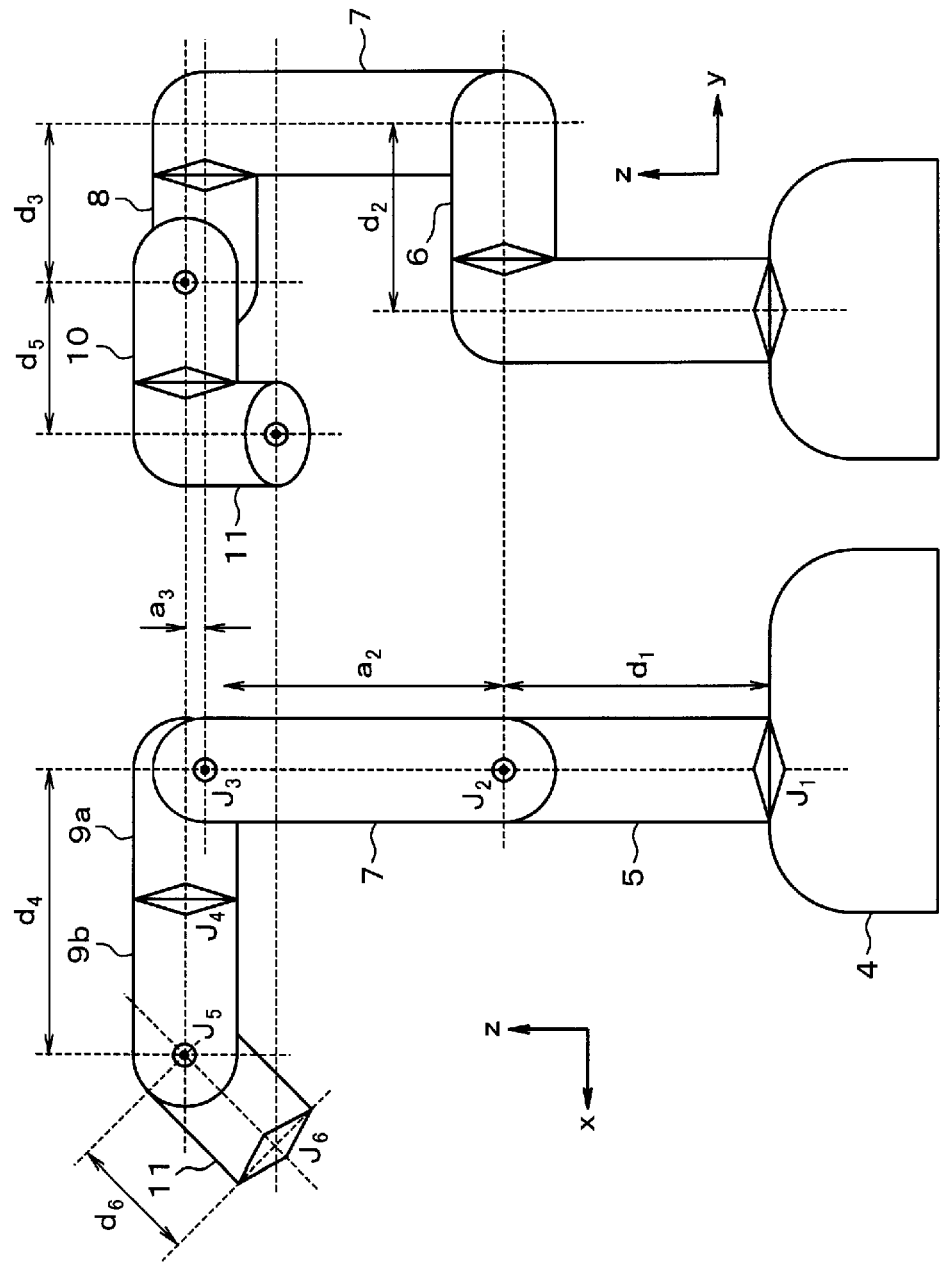
FIG. 3 is a diagram showing a robot configuration projected on an xz plane and a yz plane.

The distance a3 is illustrated in FIG. 3 for reference. The link length d5 corresponds to the link length of the fifth offset arm 10.

First of all, on the premise of explaining the inverse transform process carried out in the present embodiment, a forward transform process will now be described.

<Forward Transform Process>

DH parameters are decided as shown in table 1, by performing coordinate conversions in the order of z-axis rotation, z-axis translation, x-axis translation, and x-axis rotation. $\theta_i$ indicates a rotation angle of each of the joints which rotates from an angular state shown in FIG. 2.

TABLE 1

| | DH parameters | | | |
|---|---|---|---|---|
| | $\theta_i$ | $d_i$ (S) | $a_i$ | $\alpha_i$ |
| 1 | $\theta_1$ | $d_1$ | $a_1 = 0$ | −90 |
| 2 | $\theta_2 - 90$ | $d_2$ | $a_2$ | 0 |
| 3 | $\theta_3 + 90$ | $-d_3$ | $-a_3$ | +90 |
| 4 | $\theta_4$ | $d_4$ | 0 | −90 |
| 5 | $\theta_5$ | $-d_5$ | 0 | +90 |
| 6 | $\theta_6$ | $d_6$ | 0 | 0 |

Homogeneous transformation matrixes expressing a base coordinate system $\Sigma_0$ to a mechanical interface coordinate system $\Sigma_6$ are as follows. In the following matrixes, n, o and a denote a normal vector, an orient vector, and an approach vector, respectively. For simplifying denotations, $\sin\theta_i$ and $\cos\theta_i$ are denoted as $s_i$ and $c_i$, respectively. In addition, for example, $S_{23}$ denotes $\sin(\theta_2+\theta_3)$.

$$^{i-1}T_i = \begin{bmatrix} \cos\theta_i & -\sin\theta_i & 0 & 0 \\ \sin\theta_i & \cos\theta_i & 0 & 0 \\ 0 & 0 & 1 & 0 \\ 0 & 0 & 0 & 1 \end{bmatrix}\begin{bmatrix} 1 & 0 & 0 & 0 \\ 0 & 1 & 0 & 0 \\ 0 & 0 & 1 & d_i \\ 0 & 0 & 0 & 1 \end{bmatrix}\begin{bmatrix} 1 & 0 & 0 & a_i \\ 0 & 1 & 0 & 0 \\ 0 & 0 & 1 & 0 \\ 0 & 0 & 0 & 1 \end{bmatrix} \tag{1}$$

$$\begin{bmatrix} 1 & 0 & 0 & 0 \\ 0 & \cos\alpha_i & -\sin\alpha_i & 0 \\ 0 & \sin\alpha_i & \cos\alpha_i & 0 \\ 0 & 0 & 0 & 1 \end{bmatrix}$$

$$^{0}T_1 = \begin{bmatrix} c_1 & -s_1 & 0 & 0 \\ s_1 & c_1 & 0 & 0 \\ 0 & 0 & 1 & 0 \\ 0 & 0 & 0 & 1 \end{bmatrix}\begin{bmatrix} 1 & 0 & 0 & a_1 \\ 0 & 1 & 0 & 0 \\ 0 & 0 & 1 & d_1 \\ 0 & 0 & 0 & 1 \end{bmatrix}\begin{bmatrix} 1 & 0 & 0 & 0 \\ 0 & 0 & 1 & 0 \\ 0 & -1 & 0 & 0 \\ 0 & 0 & 0 & 1 \end{bmatrix} = \tag{2}$$

$$\begin{bmatrix} c_1 & 0 & -s_1 & a_1c_1 \\ s_1 & 0 & c_1 & a_1s_1 \\ 0 & -1 & 0 & d_1 \\ 0 & 0 & 0 & 1 \end{bmatrix}$$

$$^{1}T_2 = \begin{bmatrix} s_2 & c_2 & 0 & 0 \\ -c_2 & s_2 & 0 & 0 \\ 0 & 0 & 1 & 0 \\ 0 & 0 & 0 & 1 \end{bmatrix}\begin{bmatrix} 1 & 0 & 0 & a_2 \\ 0 & 1 & 0 & 0 \\ 0 & 0 & 1 & d_2 \\ 0 & 0 & 0 & 1 \end{bmatrix}\begin{bmatrix} 1 & 0 & 0 & 0 \\ 0 & 1 & 0 & 0 \\ 0 & 0 & 1 & 0 \\ 0 & 0 & 0 & 1 \end{bmatrix} = \tag{3}$$

$$\begin{bmatrix} s_2 & c_2 & 0 & a_2c_2 \\ -c_2 & s_2 & 0 & -a_2s_2 \\ 0 & 0 & 1 & d_2 \\ 0 & 0 & 0 & 1 \end{bmatrix}$$

$$^{2}T_3 = \begin{bmatrix} -s_3 & -c_3 & 0 & 0 \\ c_3 & -s_3 & 0 & 0 \\ 0 & 0 & 1 & 0 \\ 0 & 0 & 0 & 1 \end{bmatrix}\begin{bmatrix} 1 & 0 & 0 & -a_3 \\ 0 & 1 & 0 & 0 \\ 0 & 0 & 1 & -d_3 \\ 0 & 0 & 0 & 1 \end{bmatrix}\begin{bmatrix} 1 & 0 & 0 & 0 \\ 0 & 0 & -1 & 0 \\ 0 & 1 & 0 & 0 \\ 0 & 0 & 0 & 1 \end{bmatrix} = \tag{4}$$

$$\begin{bmatrix} -s_3 & 0 & c_3 & a_3s_3 \\ c_3 & 0 & s_3 & -a_3c_3 \\ 0 & 1 & 0 & -d_3 \\ 0 & 0 & 0 & 1 \end{bmatrix}$$

$$^{3}T_4 = \begin{bmatrix} c_4 & -s_4 & 0 & 0 \\ s_4 & c_4 & 0 & 0 \\ 0 & 0 & 1 & 0 \\ 0 & 0 & 0 & 1 \end{bmatrix}\begin{bmatrix} 1 & 0 & 0 & 0 \\ 0 & 1 & 0 & 0 \\ 0 & 0 & 1 & d_4 \\ 0 & 0 & 0 & 1 \end{bmatrix}\begin{bmatrix} 1 & 0 & 0 & 0 \\ 0 & 0 & 1 & 0 \\ 0 & -1 & 0 & 0 \\ 0 & 0 & 0 & 1 \end{bmatrix} = \tag{5}$$

$$\begin{bmatrix} c_4 & 0 & -s_4 & 0 \\ s_4 & 0 & c_4 & 0 \\ 0 & -1 & 0 & d_4 \\ 0 & 0 & 0 & 1 \end{bmatrix}$$

$$^{4}T_5 = \begin{bmatrix} c_5 & -s_5 & 0 & 0 \\ s_5 & c_5 & 0 & 0 \\ 0 & 0 & 1 & 0 \\ 0 & 0 & 0 & 1 \end{bmatrix}\begin{bmatrix} 1 & 0 & 0 & 0 \\ 0 & 1 & 0 & 0 \\ 0 & 0 & 1 & -d_5 \\ 0 & 0 & 0 & 1 \end{bmatrix}\begin{bmatrix} 1 & 0 & 0 & 0 \\ 0 & 0 & -1 & 0 \\ 0 & 1 & 0 & 0 \\ 0 & 0 & 0 & 1 \end{bmatrix} = \tag{6}$$

$$\begin{bmatrix} c_5 & 0 & s_5 & 0 \\ s_5 & 0 & -c_5 & 0 \\ 0 & 1 & 0 & -d_5 \\ 0 & 0 & 0 & 1 \end{bmatrix}$$

$$^{5}T_6 = \begin{bmatrix} c_6 & -s_6 & 0 & 0 \\ s_6 & c_6 & 0 & 0 \\ 0 & 0 & 1 & 0 \\ 0 & 0 & 0 & 1 \end{bmatrix}\begin{bmatrix} 1 & 0 & 0 & 0 \\ 0 & 1 & 0 & 0 \\ 0 & 0 & 1 & d_6 \\ 0 & 0 & 0 & 1 \end{bmatrix}\begin{bmatrix} 1 & 0 & 0 & 0 \\ 0 & 1 & 0 & 0 \\ 0 & 0 & 1 & 0 \\ 0 & 0 & 0 & 1 \end{bmatrix} = \tag{7}$$

$$\begin{bmatrix} c_6 & -s_6 & 0 & 0 \\ s_6 & c_6 & 0 & 0 \\ 0 & 0 & 1 & d_6 \\ 0 & 0 & 0 & 1 \end{bmatrix}$$

$$^{0}T_2 = \begin{bmatrix} c_1s_2 & c_1s_2 & -s_1 & x_1 + a_2c_1s_2 - d_2s_1 \\ s_1s_2 & s_1c_2 & c_1 & y_1 + a_2s_1s_2 + d_2c_1 \\ c_2 & -s_2 & 0 & z_1 + a_2c_2 \\ 0 & 0 & 0 & 1 \end{bmatrix} \tag{8}$$

$$^{0}T_3 = \tag{9}$$

$$\begin{bmatrix} c_1(c_2c_3 - s_2s_1) & -s_1 & c_1\begin{pmatrix} s_2c_3 + \\ c_2s_3 \end{pmatrix} & x_2 - a_3c_1(c_2c_3 - s_2s_3) + d_3s_1 \\ s_1(c_2c_3 - s_2s_3) & c_1 & s_1\begin{pmatrix} s_2c_3 + \\ c_2s_3 \end{pmatrix} & y_2 - a_3c_1(c_2c_3 - s_2s_3) - d_3s_1 \\ -s_2c_3 - c_2s_3 & 0 & c_2c_3 - s_2s_3 & z_2 + a_3(c_2s_3 + s_2s_3) \\ 0 & 0 & 0 & 1 \end{bmatrix} =$$

$$\begin{bmatrix} c_1c_{23} & -s_1 & c_1s_{23} & x_2 - a_3c_1c_{23} + d_3s_1 \\ s_1c_{23} & c_1 & s_1s_{23} & y_2 - a_3s_1c_{23} - d_3c_1 \\ -s_{23} & 0 & c_{23} & z_2 + a_3s_{23} \\ 0 & 0 & 0 & 1 \end{bmatrix}$$

$$^{0}T_4 = \begin{bmatrix} c_1c_{23}c_4 - s_1s_4 & -c_1s_{23} & -c_1c_{23}s_4 - s_1c_4 & x_3 + d_4c_1s_{23} \\ c_1s_4 + s_1c_{23}c_4 & -s_1s_{23} & c_1c_4 - s_1c_{23}s_4 & y_3 + d_4s_1s_{23} \\ -s_{23}c_4 & -c_{23} & s_{23}s_4 & z_3 + d_4c_{23} \\ 0 & 0 & 0 & 1 \end{bmatrix} \tag{10}$$

$$\begin{bmatrix} n_{x4} & o_{x4} & a_{x4} & x_4 \\ n_{y4} & o_{y4} & a_{y4} & y_4 \\ n_{z4} & o_{z4} & a_{z4} & z_4 \\ 0 & 0 & 0 & 1 \end{bmatrix}$$

$$^{0}T_5 = \begin{bmatrix} n_{x4}c_5 + o_{x4}s_5 & a_{x4} & n_{x4}s_5 - o_{x4}c_5 & x_4 - a_{x4}d_5 \\ n_{y4}c_5 + o_{y4}s_5 & a_{y4} & n_{y4}s_5 - o_{y4}c_5 & y_4 - a_{y4}d_5 \\ n_{z4}c_5 + o_{z4}s_5 & a_{z4} & n_{z4}s_5 - o_{z4}c_5 & z_4 - a_{z4}d_5 \\ 0 & 0 & 0 & 1 \end{bmatrix} \tag{11}$$

$$\begin{bmatrix} n_{x5} & o_{x5} & a_{x5} & x_5 \\ n_{y5} & o_{y5} & a_{y5} & y_5 \\ n_{z5} & o_{z5} & a_{z5} & z_5 \\ 0 & 0 & 0 & 1 \end{bmatrix}$$

-continued $$^0T_6 = \begin{bmatrix} n_{x5}c_6 + o_{x5}s_6 & -n_{x5}s_6 + o_{x5}c_6 & a_{x5} & x_5 + a_{x5}d_6 \\ n_{y5}c_6 + o_{y5}s_6 & -n_{y5}s_6 + o_{y5}c_6 & a_{y5} & y_5 + a_{y5}d_6 \\ n_{z5}c_6 + o_{z5}s_6 & -n_{z5}s_6 + o_{z5}c_6 & a_{z5} & z_5 + a_{z5}d_6 \\ 0 & 0 & 0 & 1 \end{bmatrix} = \quad (12)$$

$$\begin{bmatrix} n_{x6} & o_{x6} & a_{x6} & x_6 \\ n_{y6} & o_{y6} & a_{y6} & y_6 \\ n_{z6} & o_{z6} & a_{z6} & z_6 \\ 0 & 0 & 0 & 1 \end{bmatrix}$$

When expanding formulae (8) to (10), formulae (13) to (15) can be obtained.

$$^0T_2 = \begin{bmatrix} c_1s_2 & c_1c_2 & -s_1 & c_1(a_1 + a_2s_2) - d_2s_1 \\ s_1s_2 & s_1c_2 & c_1 & s_1(a_1 + a_3s_2) + d_2c_1 \\ c_2 & -s_2 & 0 & d_1 + a_2c_2 \\ 0 & 0 & 0 & 1 \end{bmatrix} \quad (13)$$

$$^0T_3 = \begin{bmatrix} c_1c_{23} & -s_1 & c_1s_{23} & c_1(a_1 + a_2s_2 - a_3c_{23}) - s_1(d_2 - d_3) \\ s_1c_{23} & c_1 & s_1s_{23} & s_1(a_1 + a_2s_2 - a_3c_{23}) + c_1(d_2 - d_3) \\ -s_{23} & 0 & c_{23} & d_1 + a_2c_2 + a_3s_{23} \\ 0 & 0 & 0 & 1 \end{bmatrix} \quad (14)$$

$$^0T_4 = \begin{bmatrix} c_1c_{23}c_4 - s_1s_4 & -c_1s_{23} & -c_1c_{23}s_4 - s_1c_4 & c_1\begin{pmatrix} a_1 + a_2s_2 - \\ a_3c_{23} + d_4s_{23} \end{pmatrix} - s_1(d_2 - d_3) \\ c_1s_4 + s_1c_{23}c_4 & -s_1s_{23} & c_1c_4 - s_1c_{23}s_4 & s_1\begin{pmatrix} a_1 + a_2s_2 - \\ a_3c_{23} + d_4s_{23} \end{pmatrix} + c_1(d_2 - d_3) \\ -s_{23}c_4 & -c_{23} & s_{23}s_4 & d_1 + a_2c_2 + a_3s_{23} + d_4c_{23} \\ 0 & 0 & 0 & 1 \end{bmatrix} \quad (15)$$

Positional coordinates and normal, orientation, and approach vectors for each of the fifth and sixth axes are provided as follows:

$$\begin{bmatrix} n_{x5} \\ n_{y5} \\ n_{z5} \end{bmatrix} = \begin{bmatrix} c_1(c_{23}c_4c_5 - s_{23}s_5) - s_1s_4c_5 \\ s_1(c_{23}c_4c_5 - s_{23}s_5) + c_1s_4c_5 \\ -s_{23}c_4c_5 - c_{23}s_5 \end{bmatrix} \quad (16)$$

$$\begin{bmatrix} o_{x5} \\ o_{y5} \\ o_{z5} \end{bmatrix} = \begin{bmatrix} -c_1c_{23}s_4 - s_1s_4 \\ -s_1c_{23}s_4 + c_1c_4 \\ s_{23}s_4 \end{bmatrix}$$

$$\begin{bmatrix} a_{x5} \\ a_{y5} \\ a_{z5} \end{bmatrix} = \begin{bmatrix} c_1(c_{23}c_4s_5 + s_{23}s_5) - s_1s_4s_5 \\ s_1(c_{23}c_4c_5 + s_{23}c_5) + c_1s_4s_5 \\ -s_{23}c_4c_5 + c_{23}c_5 \end{bmatrix}$$

$$\begin{bmatrix} x_5 \\ y_5 \\ z_5 \end{bmatrix} = \begin{bmatrix} c_1(a_1 + a_2s_2 - (a_3 - s_4d_5)c_{23} + d_4s_{23}) - \\ s_1(d_2 - d_3 - c_4d_5) \\ s_1(a_1 + a_2s_2 - (a_3 - s_4d_5)c_{23} + d_4s_{23}) + \\ c_1(d_2 - d_3 - c_4d_5) \\ d_1 + a_2c_2 + (a_3 - s_4d_5)s_{23} + d_4c_{23} \end{bmatrix} \quad (17)$$

$$\begin{bmatrix} n_{x6} \\ n_{y6} \\ n_{z6} \end{bmatrix} = \begin{bmatrix} c_1(c_{23}(c_4c_5c_6 - s_4s_6) - s_{23}s_5c_6) - s_1(s_4c_5c_6 + c_4s_6) \\ s_1(c_{23}(c_4c_5c_6 - s_4s_6) - s_{23}s_5c_6) + c_1(s_4c_5c_6 + c_4s_6) \\ s_{23}(-c_4c_5c_6 + s_4s_6) - c_{23}s_5c_6 \end{bmatrix}$$

$$\begin{bmatrix} o_{x6} \\ o_{y6} \\ o_{z6} \end{bmatrix} = \begin{bmatrix} c_1(-c_{23}(c_4c_5s_6 + s_4s_6) + s_{23}s_5s_6) + s_1(s_4c_5s_6 - c_4c_6) \\ s_1(-c_{23}(c_4c_5s_6 + s_4c_6) + s_{23}s_5s_6) - c_1(s_4c_5s_6 - c_4c_6) \\ (c_4c_5s_6 + s_4c_6)s_{23} + s_5s_6c_{23} \end{bmatrix} \quad (18)$$

$$\begin{bmatrix} a_{x6} \\ a_{y6} \\ a_{z6} \end{bmatrix} = \begin{bmatrix} c_1(c_{23}c_4s_5 + s_{23}c_5) - s_1s_4c_5 \\ s_1(c_{23}c_4s_5 + s_{23}c_5) + c_1s_4s_5 \\ -s_{23}c_4c_5 + c_{23}c_5 \end{bmatrix}$$

$$\begin{bmatrix} x_6 \\ y_6 \\ z_6 \end{bmatrix} = \begin{bmatrix} c_1(a_1 + a_2s_2 - (a_3 - s_4d_5 - c_4s_5d_6)c_{23} + (d_4 + c_5d_6)s_{23}) - \\ s_1(d_2 - d_3 - c_4d_5 + s_4s_5d_6) \\ s_1(a_1 + a_2s_2 - (a_3 - s_4d_5 - c_4s_5d_6)c_{23} + (d_4 + c_5d_6)s_{23}) + \\ c_1(d_2 - d_3 - c_4d_5 + s_4s_5d_6) \\ d_1 + a_2c_2 + (a_3 - s_4d_5 - c_4s_5d_6)s_{23} + (d_4 + c_5d_6)c_{23} \end{bmatrix} \quad (19)$$

These matrixes are homogeneous transformation matrixes, so that these matrixes can be converted to a position vector in the base coordinate system $\Sigma_0$ by multiplying position vectors in the tool coordinate system by such matrixes from the left for the product. That is, based on the joint angles and the DH parameters, a tip position of the position vector in the base coordinate system can be obtained. The orientation angle of the position vector is expressed by normal, orientation, and approach vectors n6, o6 and a6 of the sixth axis.

<Inverse Transform Process>

An inverse transform process will now be explained. It is now assumed that the position and orientation of the end effector of the robot arm are given by a homogeneous transformation matrix. A position vector in the base coordinate system $\Sigma_0$ shown in FIG. 2 is denoted by $p_t$. From an approach vector $a_6$, a wrist position $p_5$ is obtained based on:

$$p_5 = p_6 - d_6 a_6 \quad (20)$$

A conventional 6-axis vertical articulated robot is structured such that rotation axes of the fourth, fifth, and sixth axes are mutually perpendicular at the wrist position. Hence, in this structure, the first, second, and third axes are first analyzed in relation to a wrist position, which enables all the joint angles to be obtained. Specifically, because the wrist position is on the respective rotation axes of the fourth, fifth, and sixth axes, the wrist position is not changed even if angles of one or more axes among the fourth, fifth, and sixth axes are changed. In contrast, in the 6-axis vertical articulated robot according to the present embodiment, a position $p_4$ is changed due to changes in one or more axes among the fourth, fifth, and sixth axes, thus making the conventional approach impossible to obtain all the joint angles.

With consideration of this situation, how to solve this problem will now be described based on an assumption that an angle of the sixth axis is provisionally given. If a rotation range of the sixth axis is for instance −180 degree to +180 degree, the joint angles are searched at angular step sizes properly set during the rotation range which is also called "SINGLE". When the angle of the sixth axis is once decided, the position $p_4$ can be obtained by using formulae (11) and (12).

$$p_4 = a_4 d_6 + p_6 \quad (21)$$

$$= o_6 d_6 + p_6$$

$$= (o_6 s_6 + o_6 c_6) d_6 + p_6$$

Figure 4:
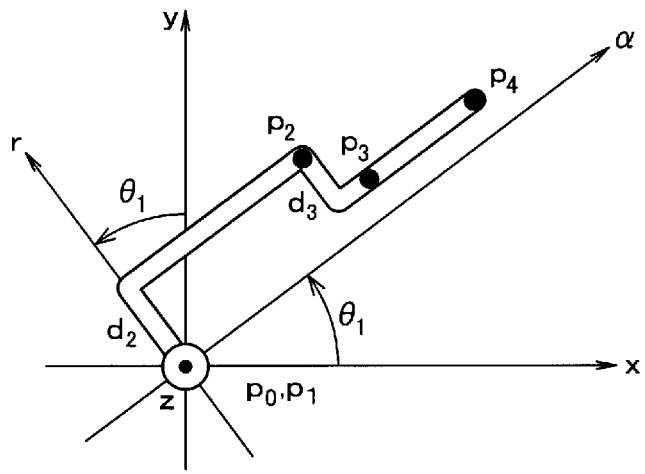
FIG. 4 shows both an xy coordinate and an αr coordinate on both of which a robot arm form is depicted.

In this case, as shown in FIG. 4, a αr coordinate system is set by rotating the xy axes by $\theta_1$, in which, however, since a link parameter $a_1$ is $a_1=0$, a formula for $a_1 \neq 0$ becomes different for that for $a_1=0$. The position $p_4$ is decided, a formula which do not use the one-axis angle can express an α coordinate. In addition, an arm form for $\alpha_{14} \geq 0$ is defined as LEFTY, while that for $\alpha_{14} < 0$ is defined as being RIGHTY. In a case $\alpha_{14}$ shows an imaginary, the arm does not reach a target, thus providing no solution.

$$l_{14} = \sqrt{x_4^2 + y_4^2} \tag{22}$$

$$r_{14} = d_2 - d_3 \tag{23}$$

$$\alpha_{14} = \pm \sqrt{l_{14}^2 - r_{14}^2} \tag{24}$$

In formula (24), $l_{14}$ shows a distance from the origin of the αr coordinate system to $p_4$. Accordingly, the trigonometric functions of the axis angles can be obtained as formulae (25) to (28).

$$x_4 = -r_{14} s_1 + \alpha_{14} c_1 \tag{25}$$

$$y_4 = r_{14} c_1 + \alpha_{14} s_1 \tag{26}$$

$$s_1 = -\frac{r_{14} x_4 - \alpha_{14} y_4}{r_{14}^2 + \alpha_{14}^2} = -\frac{r_{14} x_4 - \alpha_{14} y_4}{l_{14}^2} \tag{27}$$

$$c_1 = \frac{r_{14} y_4 + \alpha_{14} x_4}{r_{14}^2 + \alpha_{14}^2} = \frac{r_{14} y_4 + \alpha_{14} x_4}{l_{14}^2} \tag{28}$$

Figure 5:
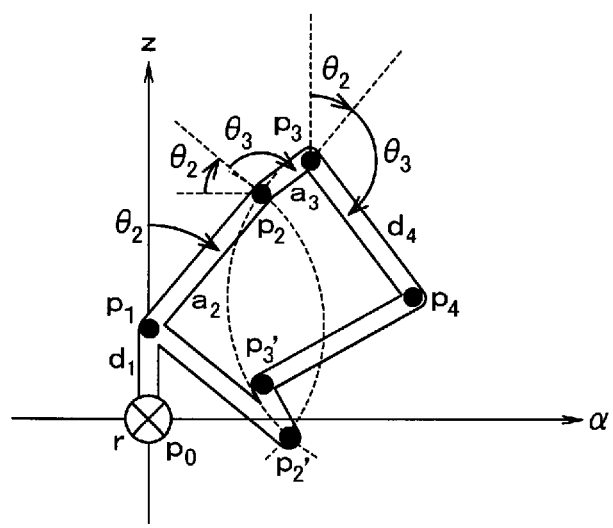
FIG. 5 shows an αz coordinate which on which a robot arm form is depicted.

As shown in FIG. 5, an αz plane which views a side of the robot 2 is introduced. There are two sets of the second and third axis angles which meets the position $p_4$. Formulae (29) and (30) are established based on an arm length from $p_1$ to $p_2$ and an arm length from $p_2$ to $p_4$.

$$\alpha_{12}^2 + z_{12}^2 = a_2^2 \tag{29}$$

$$\alpha_{24}^2 + z_{24}^2 = a_3^2 + d_4^2 \tag{30}$$

The following amounts can be decided in advance.

$$z_{14} = z_4 - d_1 \tag{31}$$

$$m_{14} = \sqrt{\alpha_{14}^2 + z_{14}^2} \tag{32}$$

By expanding formula (30) and being combined with formula (29), the position $p_2$ can be obtained.

$$(\alpha_{14} - \alpha_{12})^2 + (z_{14} - z_{12})^2 = a_3^2 + d_4^2 \tag{33}$$

$$\alpha_{14}^2 - 2\alpha_{12}\alpha_{14} + z_{14}^2 - 2z_{12}z_{14} = a_3^2 + d_4^2 - a_2^2 \tag{34}$$

$$z_{12} = \frac{\alpha_{14}^2 - 2\alpha_{12}\alpha_{14} + z_{14}^2 - a_3^2 - d_4^2 + a_2^2}{2 z_{14}} \tag{35}$$

$$\alpha_{12}^2 + \left(\frac{\alpha_{14}^2 - 2\alpha_{12}\alpha_{14} + z_{14}^2 - a_3^2 - d_4^2 + a_2^2}{2 z_{14}}\right)^2 = a_2^2 \tag{36}$$

$$4 z_{14}^2 \alpha_{12}^2 + (-2\alpha_{14}\alpha_{12} + \alpha_{14}^2 + z_{14}^2 - a_3^2 - d_4^2 + a_2^2)^2 = 4 z_{14}^2 a_2^2 \tag{37}$$

$$\left\{ \begin{array}{l} 4(z_{14}^2 + \alpha_{14}^2)\alpha_{12}^2 - 4\alpha_{14}(\alpha_{14}^2 + z_{14}^2 - a_3^2 - d_4^2 + a_2^2)\alpha_{12} + \\ (\alpha_{14}^2 + z_{14}^2 - a_3^2 - d_4^2 + a_2^2)^2 - 4 z_{14}^2 a_2^2 \end{array} \right\} = 0 \tag{38}$$

$$k_1 = \alpha z_{14}^2 - a_3^2 - d_4^2 + a_2^2 \tag{39}$$

$$4 m_{14}^2 \alpha_{12}^2 - 4 \alpha_{14} k_1 \alpha_{12} + k_1^2 - 4 z_{14}^2 a_2^2 = 0 \tag{40}$$

$$\alpha_{12} = \frac{2\alpha_{14} k_1 \pm \sqrt{4 \alpha_{14}^2 k_1^2 - 4 m_{14}^2 (k_1^2 - 4 z_{14}^2 a_2^2)}}{4 m_{14}^2} \tag{41}$$

$$4\alpha_{14}^2 k_1^2 - 4 m_{14}^2 (k_1^2 - 4 z_{14}^2 a_2^2) = \\ 4\{(\alpha_{14}^2 - \alpha z_{14}^2) k_1^2 + 4 m_{14}^2 z_{14}^2 a_2^2\} = 4 z_{14}^2(-k_1^2 + 4 m_{14}^2 a_2^2) \tag{42}$$

$$k_2 = 4 m_{14}^2 a_2^2 - k_1^2 \tag{43}$$

$$\alpha_{12} = \frac{\alpha_{14} k_1 \pm |z_{14}| \sqrt{k_2}}{2 m_{14}^2} \tag{44}$$

For k2<0, the arm cannot reach a target, thus being no solution. $Z_{12}$ can be obtained in the same manner as the foregoing.

$$\alpha_{12} = \frac{\alpha_{14}^2 + z_{14}^2 - 2 z_{12} z_{14} - a_3^2 - d_4^2 + a_2^2}{2\alpha_{14}} \tag{45}$$

$$\left(\frac{\alpha_{14}^2 + z_{14}^2 - 2 z_{12} z_{14} - a_3^2 - d_4^2 + a_2^2}{2\alpha_{14}}\right)^2 + z_{12}^2 = a_2^2 \tag{46}$$

$$(-2 z_{12} z_{14} + \alpha_{14}^2 + z_{14}^2 - a_3^2 - d_4^2 + a_2^2)^2 + 4\alpha_{14}^2 z_{12}^2 = 4\alpha_{14}^2 a_2^2 \tag{47}$$

$$4 m_{14}^2 z_{12}^2 - 4 z_{14} k_1 z_{12} + k_1^2 - 4\alpha_1^2 a_2^2 = 0 \tag{48}$$

$$z_{12} = \frac{2 z_{14} k_1 \pm \sqrt{4 z_{14}^2 k_1^2 - 4 m_{14}^2 (k_1^2 - 4\alpha_{14}^2 a_2^2)}}{4 m_{14}^2} \tag{49}$$

$$4 z_{14}^2 k_1^2 - 4 m_{14}^2 (k_1^2 - 4\alpha_{14}^2 a_2^2) = \\ 4\{(z_{14}^2 - \alpha z_{14}^2) k_1^2 + 4 m_{14}^2 \alpha_{14}^2 a_2^2\} = 4\alpha_{14}^2(-k_1^2 + 4 m_{14}^2 a_2^2) \tag{50}$$

$$z_{12} = \frac{z_{14} k_1 \pm |\alpha_{14}| \sqrt{k_2}}{2 m_{14}^2} \tag{51}$$

Inserting formulae (44) and (45) into formula (29) causes a condition indicating whether the equality sign is met in formula (52), whereby the following combinations of double-sign corresponds are provided with the signs and absolute value signs removed.

$$\pm 2\alpha_{14} k_1 |z_{14}| \sqrt{k_2} \pm 2 z_{14} k_1 |\alpha_{14}| \sqrt{k_2} = 0 \tag{52}$$

$$\alpha_{12} = \frac{\alpha_{14} k_1 \mp z_{14} \sqrt{k_2}}{2 m_{14}^2} \tag{53}$$

$$z_{12} = \frac{z_{14} k_1 \pm \alpha_{14} \sqrt{k_2}}{2 m_{14}^2} \tag{54}$$

Because the following formulas are realized based on FIG. 5, the trigonometric functions of the second and third axes can be obtained. When using a tan 2(y, x), the angles of the first, second and third axes can be obtained.

$$\alpha_{12} = a_2 s_2 \tag{55}$$

$$s_2 = \frac{\alpha_{12}}{a_2} \tag{56}$$

$$z_{12} = a_2 c_2 \tag{57}$$

$$c_2 = \frac{z_{12}}{a_2} \tag{58}$$

$$\alpha_{24} = -a_3 c_{23} + d_4 s_{23} \tag{59}$$

$$z_{24} = a_3 s_{23} + d_4 c_{23} \tag{60}$$

$$s_{23} = \frac{d_4 \alpha_{24} + a_3 z_{24}}{a_3^2 + d_4^2} \tag{61}$$

$$c_{23} = \frac{-a_3 \alpha_{24} + d_4 z_{24}}{a_3^2 + d_4^2} \tag{62}$$

$$\theta_i = \operatorname{atan2}(s_i, c_i) \tag{63}$$

Figure 6:
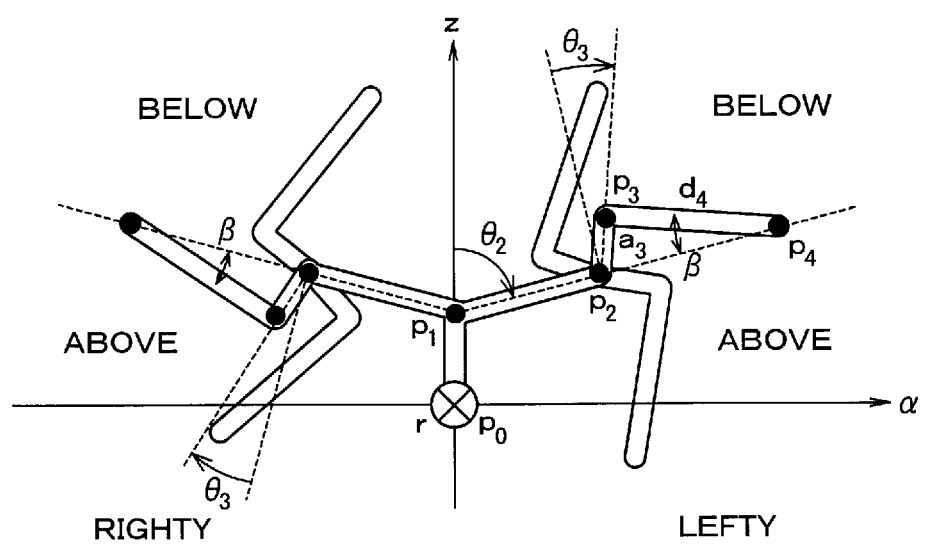
FIG. 6 shows the αz coordinate on which various forms of the robot arm are defined.

Next, forms of the arm, BELOW and ABOVE, are defined as shown in FIG. 6, the LEFTY provides ABOVE for $\theta_3 > \varphi_3$ and BELOW for $\theta_3 < \varphi_3$. Meanwhile, the RIGHTY provides BELOW for $\theta_3 > \varphi_3$ and ABOVE for $\Theta_3 < \varphi_3$. The signs of $z_{12}$ can be determined, and $\varphi_3$ can be expressed by $$\varphi_3 = a\tan 2(a_3, d_4) \tag{64}$$

As described, the angles of the first, second and third axes are decided, the head portion of the arm has provided $p_4$, $p_5$ and $p_6$ which converge at $p_4$. Hence, $a_3$ and $a_4$ should be perpendicular to each other and their inner product should be zero. As a result, when the sixth angle has an angle which gives zero to the following evaluation formula, such an angle meets the position and orientation of the arm head portion.

$$e = a_3 \cdot a_4 \tag{65}$$

$$= \begin{bmatrix} c_1 s_{23} \\ s_1 s_{23} \\ c_{23} \end{bmatrix} \cdot \left(\frac{p_4 - p_5}{d_5}\right)$$

This evaluation formula seldom shows zero due to the fact that the step size for searching the angle of the sixth axis is set discretely, so that interpolation is used to obtain a zero crossing point. Using the angle of the sixth axis which has been obtained at the zero crossing point, the angles of the first, second and third axes are re-calculated, and then, the remaining angles, i.e., the angles of the fourth and fifth axes are calculated. From the formula (18), s5 and c5 are calculated during which the denominator should not be zero.

$$n_6 = \begin{bmatrix} c_1(c_{23}(c_4 c_5 c_6 - s_4 s_6) - s_{23} s_5 c_5) - s_1(s_4 c_5 c_6 + c_4 s_6) \\ s_1(c_{23}(c_4 c_5 c_6 - s_4 s_6) - s_{23} s_5 c_6) + c_1(s_4 c_5 c_6 + c_4 s_6) \\ s_{23}(-c_4 c_5 c_6 + s_4 s_6) - c_{23} s_5 c_6 \end{bmatrix} \tag{66}$$

$$c_1 n_{x6} + s_1 n_{y6} = c_{23}(c_4 c_5 c_6 - s_4 s_6) - s_{23} s_5 c_6 \tag{67}$$

$$s_{23}(c_1 n_{x6} + s_1 n_{y6}) + c_{23} n_{z6} = -s_5 c_6 \tag{68}$$

$$s_5 = -\frac{s_{23}(c_1 n_{x6} + s_1 n_{y6}) + c_{23} n_{z6}}{c_6} \tag{69}$$

$$o_6 = \begin{bmatrix} c_1(-c_{23}(c_4 c_5 s_6 + s_4 c_6) + s_{23} s_5 s_6) + s_1(s_4 c_5 s_6 - c_4 c_6) \\ s_1(-c_{23}(c_4 c_5 s_6 + s_4 c_6) + s_{23} s_5 s_6) - c_1(s_4 c_5 s_6 - c_4 c_6) \\ (c_4 c_5 s_6 + s_4 c_6) s_{23} + s_5 s_6 c_{23} \end{bmatrix} \tag{70}$$

$$c_1 o_{x6} + s_1 o_{y6} = -c_{23}(c_4 c_5 s_6 + s_4 c_6) + s_{23} s_5 s_6 \tag{71}$$

$$s_{23}(c_1 o_{x6} + s_1 o_{y6}) + c_{23} o_{x6} = s_5 s_6 \tag{72}$$

$$s_5 = \frac{s_{23}(c_1 o_{x6} + s_1 o_{y6}) + c_{23} o_{z6}}{s_6} \tag{73}$$

$$a_6 = \begin{bmatrix} c_1(c_{23} c_4 s_5 + s_{23} c_5) - s_1 s_4 s_5 \\ s_1(c_{23} c_4 s_5 + s_{23} c_5) + c_1 s_4 s_5 \\ -s_{23} c_4 s_5 + c_{23} c_5 \end{bmatrix} \tag{74}$$

$$c_1 a_{x6} + s_1 a_{y6} = c_{23} c_4 s_5 + s_{23} c_5 \tag{75}$$

$$c_{23} a_{z6} + s_{23}(c_1 a_{x6} + s_1 a_{y6}) = c_5 \tag{76}$$

$$c_5 = c_{23} a_{z6} + s_{23}(c_1 a_{x6} + s_1 a_{y6}) \tag{77}$$

In the similar manner to the above, s4 and c4 are calculated.

$$\cos\theta_1 n_y - \sin\theta_1 n_x = \cos\theta_4 \sin\theta_6 + \sin\theta_4 \cos\theta_5 \cos\theta_6 \tag{*5}$$

$$\cos\theta_1 o_y - \sin\theta_1 o_x = \cos\theta_4 \cos\theta_6 - \sin\theta_4 \cos\theta_5 \cos\theta_6 \tag{*6}$$

$$\sin\theta_6 (\cos\theta_1 n_y - \sin\theta_1 n_x) + \cos\theta_6 (\cos\theta_1 o_y - \sin\theta_1 o_x) = \cos\theta_4 \tag{*7}$$

$$\cos\theta_6 (\cos\theta_1 n_y - \sin\theta_1 n_x) + \sin\theta_6 (\cos\theta_1 o_y - \sin\theta_1 o_x) = \sin\theta_4 \cos\theta_5 \tag{*8}$$

From formulae (*7) and (*8), $\sin\theta_4 \cos\theta_4$ can be obtained, so that the angle $\theta_4$ can be calculated. An angle $\theta_5$ has already been obtained, the formula (*8) can be divided by $\cos\theta_5$ or formulae (*9) and (*10) can be used instead.

$$\cos\theta_1 \alpha_{y6} - \sin\theta_1 \alpha_{x6} = \sin\theta_4 \sin\theta_5 \tag{*9}$$

$$\cos\theta_5 (\sin\theta_4 \cos\theta_5) + \sin\theta_5 (\sin\theta_4 \sin\theta_5) = \sin\theta_4 \tag{*10}$$

Figure 7:
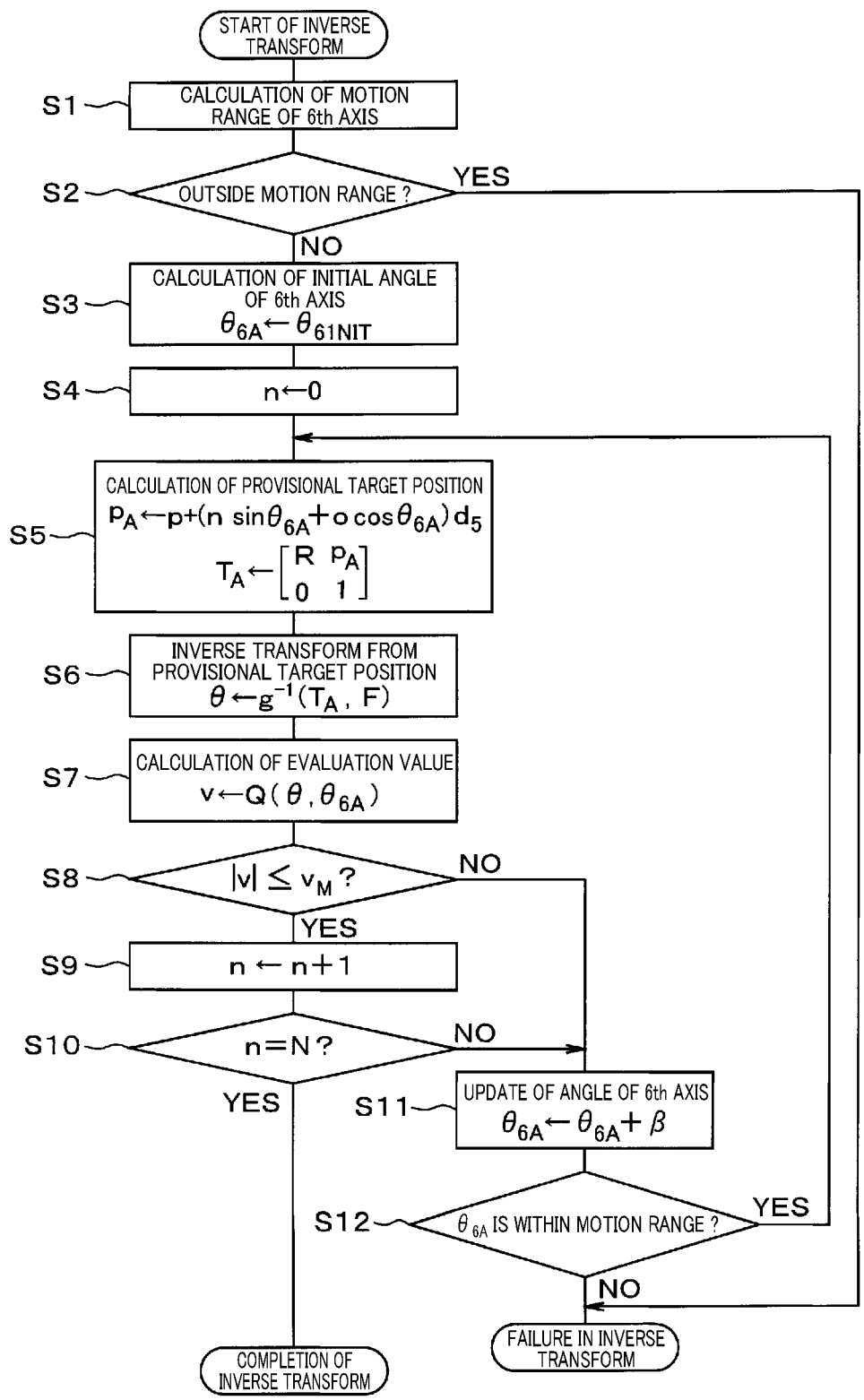
FIG. 7 is a flowchart explaining an inverse transform process performed by a controller in a first embodiment.

The inverse transform process has been outlined above. The operations of the embodiment will now be described with reference to FIGS. 7 and 8. FIG. 7 shows a flowchart explaining the inverse transform process performed by the controller 3.

Figure 8:
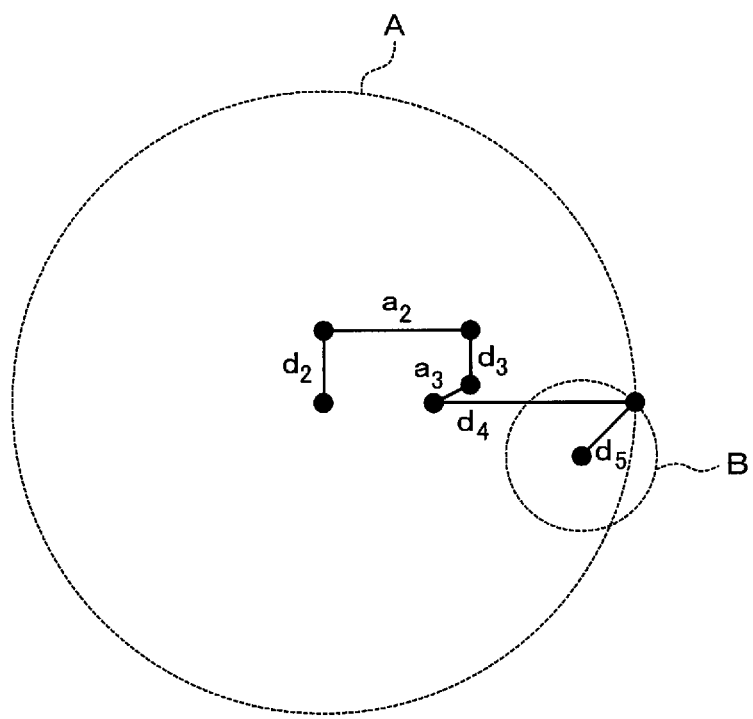
FIG. 8 is a view explain a motion range in a case of d2=d3.

First of all, a motion range of the sixth axis is calculated (step S1). FIG. 8 explains the motion range, in which it is assumed that d2=d3. In this calculation, the angle of the third axis J3 is set at a value obtained when the first arm 7 and the second arm 8 are extended to their maximum lengths, while the first axis J1 and the second axis J2 are changed in their angles and orientation to calculate a sphere A which can be reached by the fourth axis J4 and which is calculated from the base 4. The angle of the sixth axis J6 is than changed to calculate a sphere B which can be reached by the fourth axis P4 and which is calculated on the flange shown in FIG. 2.

If the region occupied by the sphere B includes a part which is located outside the sphere A, the part expresses a range positioned outside the motion range (YES at step S2), which shows a failure of the inverse transform process. When the sphere B is included in the sphere A (NO at step S2), an initial value of the sixth axis angle, $\theta_{6INT}$ is calculated so that this initial angle is provisionally decided as being θ6A (step S3). The intimal value $\theta_{6INT}$ is for example set to be the lowest angle value of the sixth axis which can be taken in its motion range. Alternatively, this initial angle value may be set to a current angle of the sixth angle. Still alternatively, if the calculated angle allows the fourth axis position to be located outside the motion range, the initial angle value may be set to an angle which allows the fourth axis position to be located inside the motion range and which is the closest to the calculated angle outside the motion range. Still alternatively, the foregoing initial angle value may be set to an angle which allows the fourth axis position to be at the center of the sphere B.

In a case of d2≠d3, the following motion range inside/outside determination is performed. When the step S2 determines that the part of the sphere B is located outside the sphere A, a value calculated in the root part in the formula (24) or (44) becomes negative. If correction is made to make the determination result in "inside the motion range", the formula (24) is changed to:

$$l_{14}^2 = r_{14}^2$$

Assuming that $L=|r_{14}|-|l_{14}|$, it is sufficient to correct the position by an amount of:

$$w = L/|l_{14}|, [wx_4 \; wy_4 \; 0]^T$$

In the case of the formula (44), $$k_2 = 4m_{14}^2 a_2^2 - k_1^2 = -m_{14}^4 + 2(a_2^2 + a_3^2 + d_4^2)m_{14}^2 - (a_2^2 - a_3^2 - d_4^2)^2$$

$k_2 = 0$ is set with:

$$m_{140}^2 = (a_2^2 + a_3^2 + d_4^2) \pm \sqrt{(a_2^2 + a_3^2 + d_4^2)^2 - (a_2^2 - a_3^2 - d_4^2)^2}$$

$$= (a_2^2 + a_3^2 + d_4^2) \pm \sqrt{\{a_2^2 + (a_3^2 + d_4^2)\}^2 - \{a_2^2 - (a_3^2 + d_4^2)\}^2}$$

$$= (a_2^2 + a_3^2 + d_4^2) \pm$$

$$\sqrt{\{a_2^4 + 2a_2^2(a_3^2 + d_4^2) + (a_3^2 + d_4^2)^4\} - \{a_2^4 - 2a_2^2(a_3^2 + d_4^2) + (a_3^2 + d_4^2)^4\}}$$

$$= (a_2^2 + a_3^2 + d_4^2) \pm 2a_2\sqrt{a_3^2 + d_4^2}$$

In case of:

$$m_{14}^2 > (a_2^2 + a_3^2 + d_4^2) + 2a_2\sqrt{a_3^2 + d_4^2}, \text{ as}$$

$$L = |m_{14}| - \sqrt{(a_2^2 + a_3^2 + d_4^2) + 2a_2\sqrt{a_3^2 + d_4^2}}$$

L is moved to approach the origin in the αz plane. If the correction has been already made in the formula (24), this correction makes the formula (24) unestablished again. In such a case, only the z-axis is corrected under $k_2=0$. Further, in case of:

$$m_{14}^2 < (a_2^2 + a_3^2 + d_4^2) - 2a_2\sqrt{a_3^2 + d_4^2}, \text{ as}$$

$$L = \sqrt{(a_2^2 + a_3^2 + d_4^2) - 2a_2\sqrt{a_3^2 + d_4^2}} - |m_{14}|$$

L is moved away from the origin in the αz plane.

Then, an amount of zero inputted into a variable n for deciding a wrist form (step S4), and a provisional target position PA is calculated (step S5). When a position vector $[x,y,z]^T$ is denoted by p, the provisional target position $P_A$ is calculated based on the formula (21) such that:

$$p + (n \sin \theta_{6A} + o \cos \theta_{6A}) d_5$$

A homogeneous transformation matrix $T_A$ is decided by a rotation matrix R and a target position $p_A$. In the present case, the provisional target position $p_{6A}$ has a relationship to the target position $P_6$ such that;

$$p_{6A} = p_6 + (n_6 \sin \theta_{6A} + o_6 \cos \theta_{6A}) d_5$$

In other words, a value which can be obtained by subtracting an offset distance $d_5$ from the target position $p_6$ becomes the provisional target position $P_{6A}$.

The variable n is used to, as will be described later, decide which is the correct number of the wrist form setting for the inverse transform process, in which the variable n is numbered to wrist forms which are sorted according to an order of amounts of possible angles of the sixth axis.

Then, based on the calculated target position $P_A$, the inverse transform process is performed (step S6). In this case, a function $g(\theta)=(T, F)$ is for calculating a homogeneous transformation matrix T and a form F of the robot 2 from an angle $\theta=[\theta_1, \theta_2, \theta_3, \theta_4, \theta_5, \theta_6]^T$ under the condition of $d_5=0$. Hence, an inverse function $g^{-1}(T, F)$ is for inverse-calculating the angle θ based the homogeneous transformation matrix T and the form F of the robot 2 under the condition of $d_5=0$.

An amount v which estimates a result of the inverse transform based on an evaluation function $Q(\theta, \theta_{6A})$ is then calculated (step S7). The evaluation function is for example an inner production which can be calculated based on the foregoing formula (65). Furthermore, it is determined whether or not the calculated evaluation amount v has an absolute value which is equal to or less than a threshold $v_M$ which is set close to zero (step S8). If such an absolute value is over the threshold $v_M$ (NO at step S8), the angle of the sixth axis, $\theta_{6A}$, is updated by adding β(>0), by way of example (step S11). It is further determined whether or not the updated angle $\theta_{6A}$ enables the sixth axis to be located within the motion range (step S12). If this determination shows "within the motion range" (YES at step S12), the process is returned to step S5, while the determination reveals "outside the motion range" (NO at step S12), it can be estimated that the inverse transform process results in failure.

Practically, the angle $\theta_{6A}$ is changed to search for all of the possible angles of the sixth axis. In addition, the initial angle value $\theta_{6INT}$ may be set to the highest value among all the possible angles of the sixth axis during which the sixth axis exists within the motion range. In such an alternative example, the angle can be updated by subtracting β. An alternative update method can be provided such that:

$$\theta_{6A} \leftarrow \theta_{6A} \alpha(\theta_6 - \theta_{6A}), 0 < \alpha \leq 1$$

Still alternatively, the values β and/or α may be changed every time the update calculation is repeated. Still, an optimization technique such as a golden section method or a simplex method may be applied to the update process.

Figure 9:
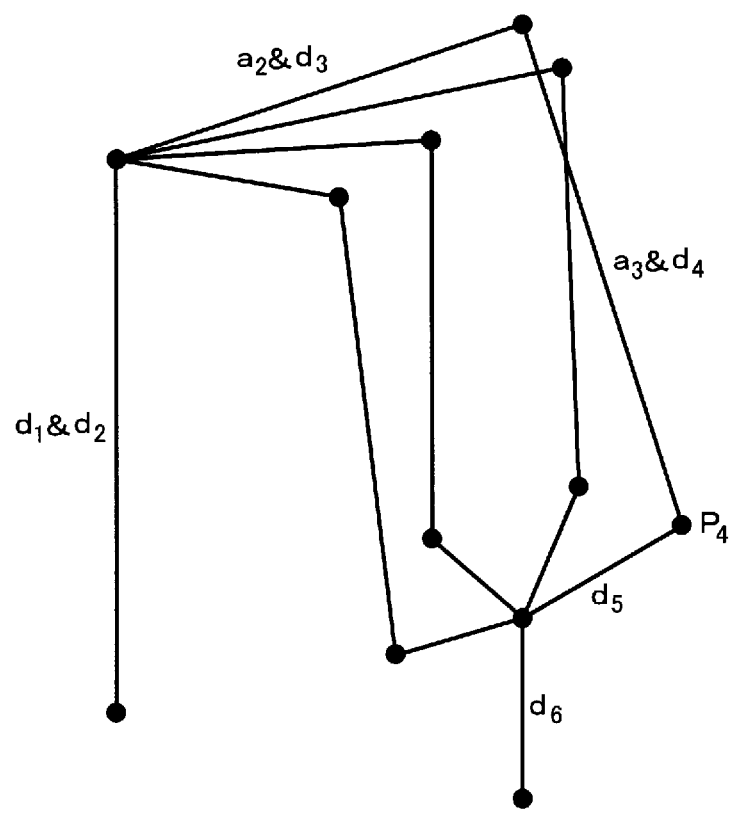
FIG. 9 is an illustration which explains four wrist forms of a robot arm at the same end-effector position.

As shown in FIG. 9, since the robot according to the present embodiment has the third offset arm 8 which provides d5≠0, a single position of the end effector is realized any one of various wrist forms of up to four. Hence, the number of angles of the sixth axis which meets the evaluation at step S9 is also four which is a maximum. For this reason, the absolute value of the evaluation value v at step S8 becomes equal to less than the threshold value $v_M$ (YES at step S8), the variable n is incremented (step S9). It is then determined whether or not the value of the variable n equals to the previously designated N-th angle of the sixth axis (step S10). If n=N is established (YES at step S10), the inverse transform process is ended, while if there is no determination of n=N (i.e., n≠N) (NO at step S10), the process will proceed to step S11. The case where it has been determined YES at step S8 reveals that the angle $\theta_6$ of the sixth axis, which has been subjected to the inverse transform, becomes approximately equal to the provisionally decided angle $\theta_{6A}$.

Accordingly, in the present embodiment, the controller 3 is configured to control the industrial robot 2 provided with the vertically articulated 6-axis arm, in which the third offset arm 8 with the fifth axis is provided to mutually connect the fourth and sixth axes and to have a link length d5, resulting in that the shaft centers of the fourth and sixth axes become parallel to each other. The control point is set at the end effector, which is the head portion of the arm, and the inverse transform process is applied to a position and an orientation of the arm, to which the control point is targeted. The position and the orientation of the arm are then subjected to the inverse transform process so as to calculate the angles of the respective axes.

Practically, a provisionally decided angle $\theta_{6A}$ of the sixth arm is introduced, in which the direction of the offset arm 8 is calculated from the angle of the sixth arm and a provisional target position $P_{6A}$ is calculated by subtracting the link length $d_5$ from a target position of the sixth arm. An amount zero is given to the link length $d_5$ for a provisional target position $P_A$, before being subjected to the inverse transform process. By evaluating a result of the inverse transform process based on the evaluation function, the axis $\theta_6$ of the sixth axis is calculated. A difference between this sixth-axis angle $\theta_6$ and the provisionally decided sixth-axis angle $\theta_{6A}$ is compared with a predetermined value. Until when the difference becomes equal to or smaller than the predetermined value, the foregoing steps starting from the provisional angle decision for the sixth axis is repeated. By this configuration, the robot 2 having the offset arm 8 of a link length $d_5$ can undergo the inverse transform process.

In addition, the controller 3 uses, as the evaluation function, an inner product of "a·a4". In a state where the inverse transform process is applied effectively, the approach vectors a3 and a4 are perpendicular to each other, so that the inner product is zero. Hence, this evaluation function can used to properly evaluate results of the inverse transform process.

Concerning the angles of the sixth axis, the wrist forms are numbered in the order of angle amounts at the same positions of the end effector, which enables the controller 3 to decide a wrist form based on results of the inverse transform process. That is, the robot provided with the offset arm of which link length d5 is given, maximally, four wrist forms for the same end-effector position. With consideration of this, of the plurality of wrist forms, the angles of any of the fourth to sixth axes, which are directed to wrist forms to be employed, are subjected to the previous numbering in a descendent or ascending order. If an angle of the axis, which results from the inverse transform, becomes equal to any of the previously numbered angles, the inverted transformed result is employed, whereby the wrist form can be decided uniquely.

Second Embodiment

In a second embodiment, the equivalent components to those described in the first embodiment are given the reference numbers for a simplified explanation, thus explaining only different parts from the first embodiment.

Figure 10:
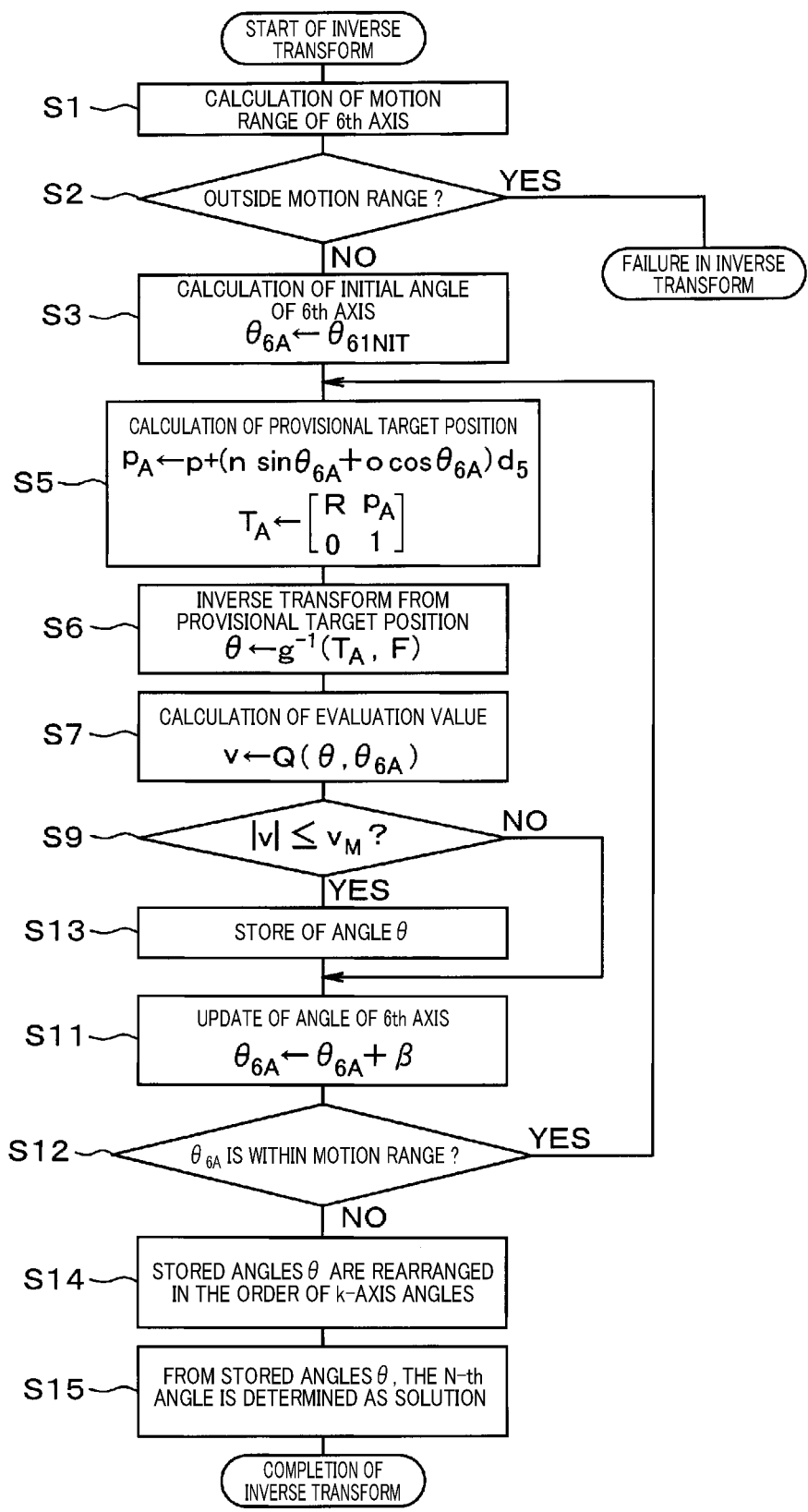
FIG. 10 is a flowchart explaining an inverse transform process performed by a controller in a second embodiment.

In the second embodiment, as to angles of the fourth or fifth axis, not to the sixth axis, the wrist forms are numbered in the order of angle amounts. Hence, as to angles of the k (=4, 5) axis, an N-th angle is designated. As shown in FIG. 10, when being YES at step S9, an angle θ which has resulted from the current inverse transform is stored in a memory or other storage means (step S13). If the determination at step S12 is NO, of the angles θ which have been stored so far, the k-axis angles are sorted in the order of their amounts (step S14). The N-th angle is then adopted as a solution (step S15).

Accordingly, in the same manner as that of the first embodiment, the second embodiment allows the inverse transform process to decide a unique wrist from.

Third Embodiment

In a third embodiment, a Jacobian matrix J is used to uniquely decide a wrist form calculated by the inverse transform process. In the third embodiment, the equivalent components to those described in the first embodiment are also given the reference numbers for a simplified explanation, thus explaining only different parts from the first embodiment.

In the first embodiment, there has been explained such that the six-axis angles which meet the evaluation carried out at step S9 are four maximally in number. However, a point which divides those boundaries should be a singular point and a Jacobian matrix J at the singular point has a determinant of zero.

Figure 11:
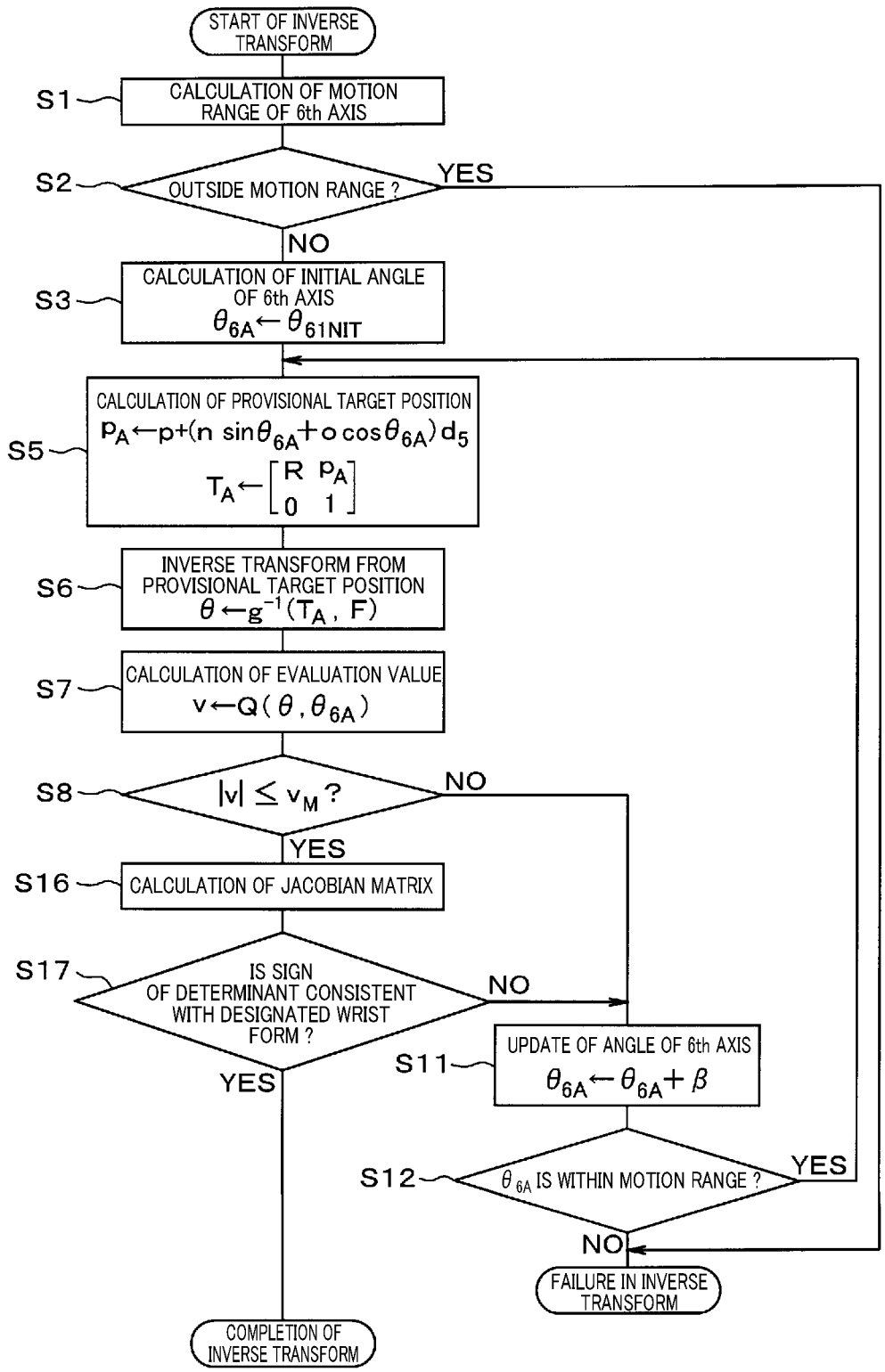
FIG. 11 is a flowchart explaining an inverse transform process performed by a controller in a third embodiment.

Specifically, in addition to arm forms of RIGHTY and LEFTY and elbow forms ABOVE and BELOW, there are combinations of wrist forms FLIP+, FLIP−, NONFLIP+, and NONFLIP−. Hence, in a flowchart shown in FIG. 11, the determination YES at step S9 is followed by calculating the determinant based on the Jacobian matrix J (step S16). The Jacobian matrix J is expressed by the following formulae (87) to (99).

$$\frac{\partial}{\partial \theta_1}\begin{bmatrix} Rx_6 \\ Ry_6 \\ Rz_6 \end{bmatrix} = \begin{bmatrix} 0 \\ 0 \\ 1 \end{bmatrix} \tag{87}$$

$$\frac{\partial}{\partial \theta_2}\begin{bmatrix} Rx_6 \\ Ry_6 \\ Rz_6 \end{bmatrix} = \begin{bmatrix} a_{x1} \\ a_{y1} \\ a_{z1} \end{bmatrix} = \begin{bmatrix} -s_1 \\ c_1 \\ 0 \end{bmatrix} \tag{88}$$

$$\frac{\partial}{\partial \theta_3}\begin{bmatrix} Rx_6 \\ Ry_6 \\ Rz_6 \end{bmatrix} = \begin{bmatrix} a_{x2} \\ a_{y2} \\ a_{z2} \end{bmatrix} = \begin{bmatrix} -s_1 \\ c_1 \\ 0 \end{bmatrix} \tag{89}$$

$$\frac{\partial}{\partial \theta_4}\begin{bmatrix} Rx_6 \\ Ry_6 \\ Rz_6 \end{bmatrix} = \begin{bmatrix} a_{x3} \\ a_{y3} \\ a_{z3} \end{bmatrix} = \begin{bmatrix} c_1 s_{23} \\ s_1 s_{23} \\ c_{23} \end{bmatrix} \tag{90}$$

$$\frac{\partial}{\partial \theta_5}\begin{bmatrix} Rx_6 \\ Ry_6 \\ Rz_6 \end{bmatrix} = \begin{bmatrix} a_{x4} \\ a_{y4} \\ a_{z4} \end{bmatrix} = \begin{bmatrix} -c_1 c_{23} s_4 - s_1 c_4 \\ c_1 c_4 - s_1 c_{23} s_4 \\ s_{23} s_4 \end{bmatrix} \tag{90}$$

$$\frac{\partial}{\partial \theta_6}\begin{bmatrix} Rx_6 \\ Ry_6 \\ Rz_6 \end{bmatrix} = \begin{bmatrix} a_{x4} \\ a_{y4} \\ a_{z4} \end{bmatrix} = \begin{bmatrix} c_1(c_{23}c_4c_5 + c_{23}c_5) - s_1 s_4 s_5 \\ s_1(c_{23}c_4c_5 + c_{23}c_5) + s_1 s_4 s_5 \\ c_{23}c_5 - c_{23}c_4 c_5 \end{bmatrix} \tag{92}$$

$$\frac{\partial}{\partial \theta_1}\begin{bmatrix} x_6 \\ y_6 \\ z_6 \end{bmatrix} = \frac{\partial}{\partial \theta_1}\begin{bmatrix} Rx_6 \\ Ry_6 \\ Rz_6 \end{bmatrix} \times {}^0 P_6 \tag{93}$$

$$= \begin{pmatrix} -s_1(a_1 + a_2 s_2 - (a_3 - s_4 d_5 - c_4 s_5 d_6)c_{23} + \\ (d_4 + c_5 d_6)s_{23}) - c_1(d_2 - d_3 - c_4 d_5 + s_4 s_5 d_6) \\ c_1(a_1 + a_2 s_2 - (a_3 - s_4 d_5 - c_4 s_5 d_6)c_{23} + \\ (d_4 + c_5 d_6)s_{23}) - s_1(d_2 - d_3 - c_4 d_5 + s_4 s_5 d_6) \\ 0 \end{pmatrix}$$

$$\frac{\partial}{\partial \theta_2}\begin{bmatrix} x_6 \\ y_6 \\ z_6 \end{bmatrix} = \frac{\partial}{\partial \theta_2}\begin{bmatrix} Rx_6 \\ Ry_6 \\ Rz_6 \end{bmatrix} \times {}^1 P_6 \tag{94}$$

$$= \begin{bmatrix} c_1(a_2 c_2 + (a_3 - s_4 d_5 - c_4 s_5 d_6)s_{23} + (d_4 + c_5 d_6)c_{23}) \\ s_1(a_2 c_2 + (a_3 - s_4 d_5 - c_4 s_5 d_6)s_{23} + (d_4 + c_5 d_6)c_{23}) \\ -a_2 s_s + (a_3 - s_4 d_5 - c_4 s_5 d_6)c_{23} - (d_4 + c_5 d_6)s_{23} \end{bmatrix}$$

$$\frac{\partial}{\partial \theta_3}\begin{bmatrix} x_6 \\ y_6 \\ z_6 \end{bmatrix} = \frac{\partial}{\partial \theta_3}\begin{bmatrix} Rx_6 \\ Ry_6 \\ Rz_6 \end{bmatrix} \times {}^2 P_6 \tag{95}$$

$$= \begin{bmatrix} c_1((a_3 - s_4 d_5 - c_4 s_5 d_6)s_{23} + (d_4 + c_5 d_6)c_{23}) \\ s_1((a_3 - s_4 d_5 - c_4 s_5 d_6)s_{23} + (d_4 + c_5 d_6)c_{23}) \\ (a_3 - s_4 d_5 - c_4 s_5 d_6)c_{23} - (d_4 + c_5 d_6)s_{23} \end{bmatrix}$$

$$\frac{\partial}{\partial \theta_4}\begin{bmatrix} x_6 \\ y_6 \\ z_6 \end{bmatrix} = \frac{\partial}{\partial \theta_4}\begin{bmatrix} Rx_6 \\ Ry_6 \\ Rz_6 \end{bmatrix} \times {}^3 P_6 \tag{96}$$

$$= \begin{bmatrix} c_1 c_{23}(c_4 d_5 - s_4 s_5 d_6) - s_1(s_4 d_5 + c_4 s_5 d_6) \\ s_1 c_{23}(c_4 d_5 - s_4 s_5 d_6) + c_1(s_4 d_5 + c_4 s_5 d_6) \\ (-c_4 d_5 + s_4 s_5 d_6)s_{23} \end{bmatrix}$$

$$\frac{\partial}{\partial \theta_5}\begin{bmatrix} x_6 \\ y_6 \\ z_6 \end{bmatrix} = \frac{\partial}{\partial \theta_5}\begin{bmatrix} Rx_6 \\ Ry_6 \\ Rz_6 \end{bmatrix} \times {}^4 P_6 \tag{97}$$

$$= \begin{bmatrix} c_1(c_{23}c_4 c_5 d_6 - s_{23} s_5 d_6) - s_1 s_4 c_5 d_6 \\ s_1(c_{23}c_4 c_5 d_6 - s_{23} s_5 d_6) + c_1 s_4 c_5 d_6 \\ -s_{23}c_4 c_5 d_6 - c_{23} s_5 d_6 \end{bmatrix}$$

$$\frac{\partial}{\partial \theta_6}\begin{bmatrix} x_6 \\ y_6 \\ z_6 \end{bmatrix} = \frac{\partial}{\partial \theta_5}\begin{bmatrix} Rx_6 \\ Ry_6 \\ Rz_6 \end{bmatrix} \times {}^5 P_6 \tag{98}$$

$$= \begin{bmatrix} 0 \\ 0 \\ 0 \end{bmatrix}$$

$$J = \frac{\partial P}{\partial \theta} = \begin{bmatrix} \frac{\partial}{\partial \theta_1}\begin{bmatrix} x \\ y \\ z \\ r_x \\ r_y \\ r_z \end{bmatrix} & \frac{\partial}{\partial \theta_2}\begin{bmatrix} x \\ y \\ z \\ r_x \\ r_y \\ r_z \end{bmatrix} & \frac{\partial}{\partial \theta_3}\begin{bmatrix} x \\ y \\ z \\ r_x \\ r_y \\ r_z \end{bmatrix} & \frac{\partial}{\partial \theta_4}\begin{bmatrix} x \\ y \\ z \\ r_x \\ r_y \\ r_z \end{bmatrix} & \frac{\partial}{\partial \theta_5}\begin{bmatrix} x \\ y \\ z \\ r_x \\ r_y \\ r_z \end{bmatrix} & \frac{\partial}{\partial \theta_6}\begin{bmatrix} x \\ y \\ z \\ r_x \\ r_y \\ r_z \end{bmatrix} \end{bmatrix} \tag{99}$$

$$= \begin{bmatrix} \frac{\partial x}{\partial \theta_1} & \frac{\partial x}{\partial \theta_2} & \frac{\partial x}{\partial \theta_3} & \frac{\partial x}{\partial \theta_4} & \frac{\partial x}{\partial \theta_5} & \frac{\partial x}{\partial \theta_6} \\ \frac{\partial y}{\partial \theta_1} & \frac{\partial y}{\partial \theta_2} & \frac{\partial y}{\partial \theta_3} & \frac{\partial y}{\partial \theta_4} & \frac{\partial y}{\partial \theta_5} & \frac{\partial y}{\partial \theta_6} \\ \frac{\partial z}{\partial \theta_1} & \frac{\partial z}{\partial \theta_2} & \frac{\partial z}{\partial \theta_3} & \frac{\partial z}{\partial \theta_4} & \frac{\partial z}{\partial \theta_5} & \frac{\partial z}{\partial \theta_6} \\ \frac{\partial r_x}{\partial \theta_1} & \frac{\partial r_x}{\partial \theta_2} & \frac{\partial r_x}{\partial \theta_3} & \frac{\partial r_x}{\partial \theta_4} & \frac{\partial r_x}{\partial \theta_5} & \frac{\partial r_x}{\partial \theta_6} \\ \frac{\partial r_y}{\partial \theta_1} & \frac{\partial r_y}{\partial \theta_2} & \frac{\partial r_y}{\partial \theta_3} & \frac{\partial r_y}{\partial \theta_4} & \frac{\partial r_y}{\partial \theta_5} & \frac{\partial r_y}{\partial \theta_6} \\ \frac{\partial r_z}{\partial \theta_1} & \frac{\partial r_z}{\partial \theta_2} & \frac{\partial r_z}{\partial \theta_3} & \frac{\partial r_z}{\partial \theta_4} & \frac{\partial r_z}{\partial \theta_5} & \frac{\partial r_z}{\partial \theta_6} \end{bmatrix}$$

Then, it is determined whether or not signs of the calculated determinant agree with a designated wrist form.

In this way, in the third embodiment, the controller 3 calculates the determinant on the Jacobian matrix J which is based on results of the inverse transform process. And, depending on signs of the determinant agree with a designated wrist form, the wrist form can be uniquely decided based on results of the inverse transform process.

For instance, when each of the axes has a movable range of −180 degrees to +180 degrees, in a case where the fifth axis is moved to visually see the form of the wrist, it can be understood that there should be combinations of the two arm forms, the two elbow forms, and the four wrist forms, at a maximum number of combinations.

The points respectively dividing the boundaries of these four wrist forms should be singular points, in which a Jacobian matrix has a determinant of zero at these singular points. As for each of the combinations of the respective forms, it is checked whether or not a wrist form resulting from the inverse transform process and signs of the determinant on the Jacobian matrix correspond to each other. This checking makes it possible to determine the wrist form agrees with a designated wrist form. That is, by considering combinations with a fourth-axis angle belonging to any of a range of −90 degrees to +90 degrees, a range of −180 degrees to −90 degrees, or a range of +90 degrees to +180 degrees, wrist forms, which is four in a maximal number, can be determined from each other.

The present invention can be changed or developed as follows, not being limited to the embodiments described above.

The inverse transform process produces results including not only the foregoing but also other modes. Such modes may include an evaluation of whether or not the forward transform of factors including $d_5$, which followed the reverse transform, results in a positional error of zero.

In addition, there may be an evaluation of whether or not a direction Z4A of the fifth axis obtained using the flange and a direction Z4 of the fifth axis obtained by the inverse transform agree with each other, i.e., an inner product thereof is equal to 1.

Further, there may be an evaluation of whether or not the forgoing direction Z4A of the fifth axis and a direction Z3 of the fourth axis obtained by the inverse transform become perpendicular to each other, i.e., an inner product thereof is equal to 0.

The foregoing repeated calculation may be conducted in a case where the motion range is divided into a plurality of motion ranges and each of the divided angle ranges is subjected to calculating an evaluation value.

In the case where the motion range is divided into a plurality of motion ranges, an approximate function of the evaluation function may be calculated based on a calculated evaluation value in the vicinity of a solution obtained from the evaluation value, and the approximate function may be used to calculate a more definite angle.

Fourth Embodiment

A fourth embodiment will now be descried.

In the fourth embodiment, the equivalent components to those described in the first embodiment are also given the reference numbers for a simplified explanation, thus explaining only different parts from the first embodiment.

The fourth embodiment differs from the first embodiment in a part of the foregoing inverse transform process. Practically, the processes which follow the foregoing formula (64) differ from those in the first embodiment.

As shown in the foregoing FIG. 6, the formula (64) expresses the angle $\varphi 3$ which provides a LEFTY case producing the arm form ABOVE for $\theta_3 > \varphi 3$ and the arm form BELOW for $\Theta_3 < \varphi 3$, and a RIGHTY case producing the arm form BELOW for $\theta_3 > \varphi$ and the arm form ABOVE for $\theta_3 < \varphi 3$.

Then, angles $\theta_5$ and $\theta_6$ will now be obtained.

$$\sin\theta_5 \cos\theta_6 = -\sin(\theta_2+\theta_3)(\cos\theta_1 \, n_x + \sin\theta_1 \, n_y) - \cos(\theta_2+\theta_3)n_z \quad (*1)$$

$$\sin\theta_5 \sin\theta_6 = \sin(\theta_2+\theta_3)(\cos\theta_1 \, o_x + \sin\theta_2 \, o_y) + \cos(\theta_2+\theta_3)o_z \quad (*2)$$

$$\sin^2\theta_5 = \sin^2\theta_5(\sin^2\theta_6 + \cos^2\theta_6) = (\sin\theta_5 \sin\theta_6)^2 + (\sin\theta_5 \cos\theta_6)^2 \quad (*3)$$

$$\sin\theta_5 = \pm\sqrt{\sin^2\theta_5} = \pm\sqrt{(\sin\theta_5 \sin\theta_6)^2 + (\sin\theta_5 \cos\theta_6)^2} \quad (*4)$$

From the formula (*4), the angle $\theta_5$ can be obtained. Additionally, from the formula (*4) and formulae (*1) and (*2), $\sin\theta_6$ and $\cos\theta_6$ are obtained, whereby the angle $\theta_6$ can be obtained.

$$\cos\theta_1 \, n_y - \sin\theta_1 \, n_x = \cos\theta_4 \sin\theta_6 + \sin\theta_4 \cos\theta_5 \cos\theta_6 \quad (*5)$$

$$\cos\theta_1 \, o_y - \sin\theta_1 \, o_x = \cos\theta_4 \cos\theta_6 - \sin\theta_4 \cos\theta_5 \sin\theta_6 \quad (*6)$$

$$\sin\theta_6 (\cos\theta_1 \, n_y - \sin\theta_1 \, n_x) + \cos\theta_6 (\cos\theta_1 \, o_y - \sin\theta_1 \, o_x) = \cos\theta_4 \quad (*7)$$

$$\cos\theta_6 (\cos\theta_1 \, n_y - \sin\theta_1 \, n_x) - \sin\theta_6 (\cos\theta_1 \, o_y - \sin\theta_1 \, o_x) = \sin\theta_4 \cos\theta_5 \quad (*8)$$

Moreover, the formulae (*7) and (*8) give $\sin\theta_4$ and $\cos\theta_4$, thereby giving the angle $\theta_4$. Incidentally, since the formula (*4) includes double signs of $\pm$, a sign which meets conditions for the fourth-axis angle or the fifth-axis angle is employed. Alternatively to this method, with consideration that the angle $\theta_5$ is found first, the formula (*8) can be divided by $\cos\theta_5$ or the formulae (*9) and (*10) may be used instead.

$$\cos\theta_1 \, \alpha_{y6} - \sin\theta_1 \, \alpha_{x6} = \sin\theta_4 \sin\theta_5 \quad (*9)$$

$$\cos\theta_5 (\sin\theta_4 \cos\theta_5) + \sin\theta_5 (\sin(\sin\theta_4 \sin\theta_5)) = \sin\theta_4 \quad (*10)$$

The inverse transform process according to the present embodiment has been outlined.

Figure 13:
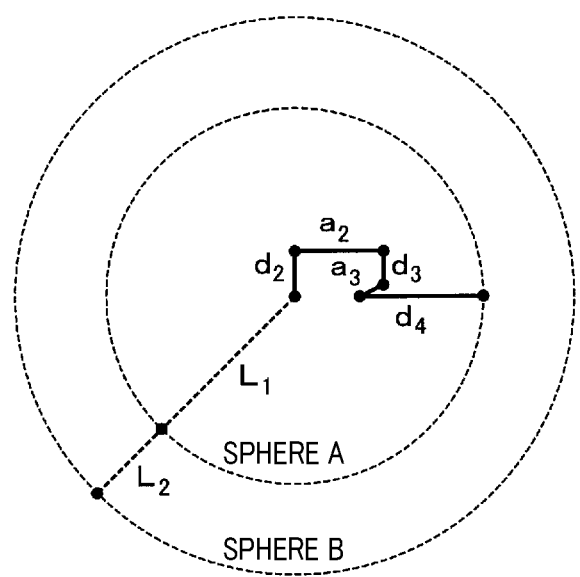
FIG. 13 is an illustration explaining a motion range provided when d2=d3 in the fourth embodiment.

With reference to FIGS. 12 and 13, the operations of the present embodiment will now be described. FIG. 12 is a flowchart showing the inverse transform process performed by the controller 3.

First of all, when the position of the sixth axis is provisionally decided as being P6', the position P6' is used to provisionally decide the position of the fifth axis as being P5'. These positions are then used to calculate a homogeneous transformation matrix T' (step S21). It is then determined whether or not the provisional position P5' is within a motion range (step S22).

FIG. 13 illustrates the motion range on the assumption of d2=d3. A sphere A having a radius of L1 and a sphere B having a radius of L1+L2 are set. The radiuses L1 and L2 are defined as the following formulae (*11) and (*12).

$$L_1 = \sqrt{(d_2 - d_3)^2 + \left(a_2 + \sqrt{a_3^2 + d_4^2}\right)^2} \quad (*11)$$

$$L_2 = \sqrt{d_5^2 + d_6^2} \quad (*12)$$

If the provisional position P5' is located outside the sphere A (step S22; outside the motion range), a distance L from a position defined by the homogeneous transformation matrix T' to the boundary of the motion range (step S29). It is then determined whether or not the distance L is equal to or less than the link length d5 (step S30). This determination checks whether the provisional position P6' is within the motion range. When the distance L is over the link length d5 (NO at step S30), the process is terminated as being error.

Meanwhile, when the distance L is equal to or less than the link length d5 (YES at step S30), correction is made to move the provisional position P5' into inside the sphere A (step S24). For example, this correction is made such that the position P5' is moved to an intersection at which a linear line connecting the positions P1 and P5' and the sphere A cross with each other. In response to movement of the position P5', the position P6' is also moved. As a modified process at step S30, L2=L5 is set to determine whether or not the position P5' is outside the sphere B.

In addition, in the case of d2≠d3, the determination whether or not the position is inside or outside the motion range is carried out as follows. A case where it is determined that the position is outside the motion range at step S22 is limited to a case where the square root in the formula (24) or (44) provides a negative value. When it is desired to correct the position so as to be within the motion range, the case on the formula (24) is calculated such that:

$$l_{14}^2 = r_{14}^2$$

Assuming that $L = ||r_{14}| - |l_{14}||$, the position is corrected by an amount of:

$$w = L/|l_{14}|, [wx_4 \; wy_4 \; 0]^T$$

In addition, in the case on the formula (44):

$$k_2 = 4m_{14}^2 a_2^2 - k_1^2 = -m_{14}^4 + 2(a_2^2 + a_3^2 + d_4^2)m_{14}^2 - (a_2^2 - a_3^2 - d_4^2)^2$$

$k_2 = 0$ is set with:

-continued $$m_{140}^2 = (a_2^2 + a_3^2 + d_4^2) \pm \sqrt{(a_2^2 + a_3^2 + d_4^2)^2 - (a_2^2 - a_3^2 - d_4^2)^2}$$

$$= (a_2^2 + a_3^2 + d_4^2) \pm \sqrt{\{a_2^2 + (a_3^2 + d_4^2)\}^2 - \{a_2^2 - (a_3^2 + d_4^2)\}^2}$$

$$= (a_2^2 + a_3^2 + d_4^2) \pm \sqrt{\{a_2^4 + 2a_2^2(a_3^2 + d_4^2) + (a_3^2 + d_4^2)^4\} - \{a_2^4 - 2a_2^2(a_3^2 + d_4^2) + (a_3^2 + d_4^2)^4\}}$$

$$= (a_2^2 + a_3^2 + d_4^2) \pm 2a_2\sqrt{a_3^2 + d_4^2}$$

In case of:

$$m_{14}^2 > (a_2^2 + a_3^2 + d_4^2) + 2a_2\sqrt{a_3^2 + d_4^2}, \text{ as}$$

$$L = |m_{14}| - \sqrt{(a_2^2 + a_3^2 + d_4^2) + 2a_2\sqrt{a_3^2 + d_4^2}}$$

L is moved to approach the origin in the αz plane. If the correction has already been made in the formula (24), this correction makes the formula (24) unestablished again. In such a case, only the z-axis is corrected under $k_2=0$. Further, in case of:

$$m_{14}^2 < (a_2^2 + a_3^2 + d_4^2) - 2a_2\sqrt{a_3^2 + d_4^2}, \text{ as}$$

$$L = \sqrt{(a_2^2 + a_3^2 + d_4^2) - 2a_2\sqrt{a_3^2 + d_4^2}} - |m_{14}|$$

L is moved away from the origin in the αz plane.

When it is determined at step S22 that the position is within the motion range and the step S34 is executed, the inverse transform process is then performed (step S23). In this process, $g^{-1}(T', F)$ is a function for calculating an angle of $\theta'=[\theta_1', \theta_2', \theta_3', \theta_4', \theta_5', \theta_6']^T$ based on the homogeneous transformation matrix T' and the form F of the robot 2, which are given under the condition d5=0.

At the next step, the angle θ' resulting from the inverse transform is subjected to the forward transform process (step S24), which provides a homogeneous transformation matrix T" and a form F". This homogeneous transformation matrix T" includes, as its components, a rotation matrix R" and a position matrix p".

A difference between a target position p and the obtained position p" is then obtained, and a position error vector $p_E$ is obtained. And the rotation matrix of the target position p is multiplied by an inverse vector of the rotation matrix R" so as to obtain a rotation vector $R_E$ for the evaluation (step S25). It is then determined whether or not the position error vector $p_E$ has a norm $\|p_E\|$ which is equal to or less than a threshold $P_{EM}$ (step S26), and it is further determined whether or not the rotation matrix $R_E$ has an angle $\|R_E\|$ which is equal to or less than a threshold $R_{EM}$ (step S27). The terms $\|p_E\|$ and $\|R_E\|$ are defined by formulae (*13) and (*14) which are as follows:

$$p_E = [p_{Ex} \quad p_{Ey} \quad p_{Ez}]^T \|p_E\| = \sqrt{p_{Ex}^2 + p_{Ey}^2 + p_{Ez}^2} \quad (*13)$$

$$R_E = \begin{bmatrix} n_{Ex} & o_{Ex} & a_{Ex} \\ n_{Ey} & o_{Ey} & a_{Ey} \\ n_{Ez} & o_{Ez} & a_{Ez} \end{bmatrix}$$

$$\|R_E\| = \sin^{-1}\sqrt{\frac{(o_{Ez} - a_{Ey})^2 + (a_{Ex} - n_{Ex})^2 + (n_{Ey} - o_{Ex})^2}{2}} \quad (*14)$$

$$= \cos^{-1}\frac{n_{Ex} + o_{Ey} + a_{Ez} - 1}{2}$$

In response to the determination of YES at step S27, it is further determined whether or not a wrist form decided by the position p" and the rotation matrix R" corresponds to a designated wrist form (step S28). When the designated form is obtained, the inverse transform process is ended. However, if the determination of NO is given at step S26 or S27, it is further determined the number of repeated execution times in which both the inverse transform process and the forward transform process have exceeded a preterminal number is determined (step S31). If the number of repeated execution times is equal to or over the predetermined number (YES at step S31), the process will be ended after countermeasures for an error are taken. In contrast, when the number of repeated execution times are not over the predetermined number (NO at step S31), the rotation matrix R' is multiplied the evaluating rotation matrix $R_E$ and the position error vector $p_E$ is added to the position matrix p' to update the homogeneous transformation matrix T' (step S32). Then, similarly to that described at step S22, a determination for the motion range inside/outside is performed (step S33), thus proceeding to step S23 provided that the determination shows the inside of of a motion range, while proceeding to step S34 if the determination reveals the outside of the motion range.

The, the determination at step S28 will now be detailed. As shown in FIG. 9 explained in the first embodiment, if there is provided a robot is provided with a third offset arm providing d5≠0, like those in the present embodiment, four wrist forms are maximally given at a single end-effector position, so that the angles of the sixth axis, which meet the evaluation conditions at step S29, are also four in a maximal number thereof. With consideration of this, the step S28 uses a Jacobian matrix J in order to uniquely decide a wrist form among the wrist forms obtained via the inverse transform process. The sixth-axis angles, whose maximum number is four, have boundaries, in which points dividing the boundaries should be singular points and the Jacobian matrix J has a determinant of zero at the singular points.

By combing the sings of the Jacobian matrix and the fourth-axis angle belonging to which of a range of −90 degrees to +90 degrees, a range of −180 degrees to −90 degrees, or a range of +90 degrees to +180 degrees, which are based on the convectional determining way, the forms of the wrist, which are FLIP+, FLIP−, NONFLIP+, NONFLIP−, which are thus four in a maximal number, can be determined from each other.

Specifically, in addition to the arm forms of RIGHTY and LEFTY and the elbow forms of ABOVE and BELOW, there are provided combinations with the wrist forms FLIP+, FLIP−, NONFLIP+, and NONFLIP−. Hence, at step S28, the determinant of the Jacobian matrix J which is expressed by the formulae (87) to (99) is calculated.

It is then checked whether or not the signs of the calculated determinant are in accordance with the designated wrist form.

In the above-explained embodiment, the controller 3 controls the robot 2 provided with the 6-axis vertical articulated type of arm, in which the arm is provided with the third offset arm 8 which mutually connects the fourth and sixth axes and whose link has a length d5. The fifth axis is arranged at the third offset arm 8 and the shaft centers of both the fourth and sixth axes are parallel to each other. The controller 3 controls, as a control point, an end effector which is the head portion of the arm, in which a position and an orientation to which the control point is targeted are subjected to the inverse transform process to calculate the axes of the respective axes.

In addition, the controller 3 provisionally decides the position P6' of the sixth axis, and based on its provisionally decided position P6', decides the position P5' of the fifth axis. And, by the controller 3, it is determined whether both positions P5' and P6' are within a motion range obtained based on the link parameters of the robot 2. If those positions P5' and P6' are within the motion range, a homogeneous transformation matrix obtained from those positions is then subjected to an inverse transform process provided that the link length d5 is set to be zero. The angles of the respective axes, which are from the inverse transform process, are then subjected to a forward transform process.

Furthermore, the controller 3 obtains a position error vector $p_E$ which is a difference between a target position of the control point and a position obtained from the forward transform process. The controller 3 also obtains a rotation matrix $R_E$ by multiplying a rotation matrix based on the target position by an inverse matrix of the rotation matrix obtained by the forward transform process. When the position error vector $p_E$ has a norm which exceeds a threshold or the rotation matrix $R_E$ gives an angle which exceeds a threshold, a homogeneous transformation matrix in which the position error vector $p_E$ and the rotation matrix $R_E$ are reflected is repeatedly subjected to the processes starting from the inverse transform process. When the norm of the position error vector $p_E$ is equal to or less than its threshold and the the angle resulting from the rotation matrix $R_E$ is equal to or less than its threshold, the inverse transform process is completed.

According, even in the present configuration of the robot 2 provided with the offset arm which mutually links the fourth and sixth axes and has a link length d5, it is possible to carry out the inverse transform process. Practically, by provisionally setting the sixth-axis angle, the inverse transform process can be applied. And matrixes $p_E$ and $R_E$, which are obtained by applying a forward transform process to the inverse-transformed results, are estimated to make the processing converge. Hence, the inverse transform process can be performed for the angle calculation.

Meanwhile, when the positions P5' and P6' are not within the motion range, those positions P5' and P6' are corrected to shift those positions to the inside of the motion range. The position of the control point, which is decided on the homogeneous transformation matrix T', also undergoes the same way as the foregoing. That is, the control point position is determined to be within the motion range or not, and if not within the motion range, the homogeneous transformation matrix T' is corrected to make the control point position locate within the motion range. This enables the inverse transform process to be repeated continuously.

The controller 3 is thus able to use results of the inverse transform process to calculate a determinant of the Jacobian matrix J. By checking whether or not the signs of the calculated determinant is in accord with a previously designated wrist form, the results of the inverse transform process can be used to uniquely decide a wrist form in accordance with the processed results, which provides the advantageous operations which similar to those gained in the first embodiment when the Jacobian matrix J is calculated for deciding the wrist form.

Fifth Embodiment

A fifth embodiment will now be described.

The fifth embodiment provides hardware configurations which are identical to those set forth in the first embodiment, in the same way as the fourth embodiment, so that the identical components will be given the same reference numbers. In the fifth embodiment, an inverse transform process is also carried out, a part of which explanations may be duplicated from that adopted in the fourth embodiment, but in order to focus an easier and connected explanation of the whole story, the contents of an inverse transform process performed by the controller 3 will be explained from the beginning.

Figure 14:
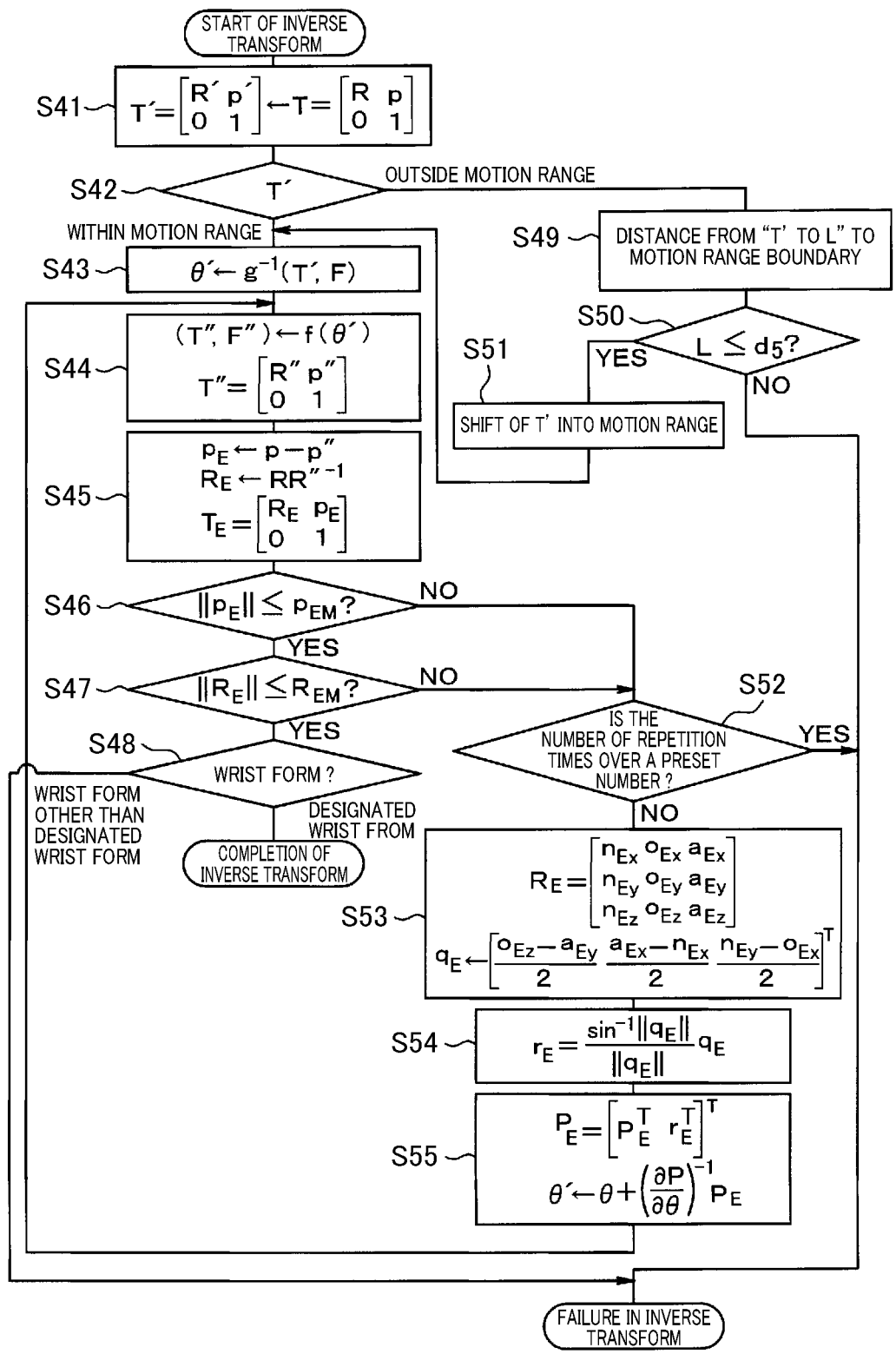
FIG. 14 is a flowchart explaining an inverse transform process performed by a controller in a fifth embodiment.

FIG. 14 is a flowchart showing how the inverse transform process is performed by the controller 3.

First of all, when the position of the sixth axis is provisionally decided as being P6', the position P6' is used to provisionally decide the position of the fifth axis as being P5'. These positions are then used to calculate a homogeneous transformation matrix T' (step S41). It is then determined whether or not the provisional position P5' is within a motion range (step S42).

The motion range is defined in the same manner as that shown in FIG. 7 in the first embodiment. The motion range is set on the assumption of d2=d3. A sphere A having a radius of L1 and a sphere B having a radius of L1+L2 are set. The radiuses L1 and L2 are defined as the following formulae (*11) and (*12).

$$L_1 = \sqrt{(d_2 - d_3)^2 + \left(a_2 + \sqrt{a_3^2 + d_4^2}\right)^2} \quad (*11)$$

$$L_2 = \sqrt{d_5^2 + d_6^2} \quad (*12)$$

If the provisional position P5' is located outside the sphere A (step S42; outside the motion range), a distance L from a position defined by the homogeneous transformation matrix T' to the boundary of the motion range (step S49). It is then determined whether or not the distance L is equal to or less than the link length d5 (step S50). This determination checks whether the provisional position P6' is within the motion range. When the distance L is over the link length d5 (NO at step S50), the process is terminated as being error.

Meanwhile, when the distance L is equal to or less than the link length d5 (YES at step S50), correction is made to move the provisional position P5' into inside the sphere A (step S51). For example, this correction is made such that the position P5' is moved to an intersection at which a linear line connecting the positions P1 and P5' and the sphere A cross with each other. In response to movement of the position P5', the position P6' is also moved. As a modified process at step S50, L2=L5 is set to determine whether or not the position P5' is outside the sphere B.

In addition, in the case of d2≠d3, the determination whether or not the position is inside or outside the motion range is carried out as follows. A case where it is determined that the position is outside the motion range at step S42 is limited to a case where the square root in the formula (24) or (44) provides a negative value. When it is desired to correct the position so as to be within the motion range, the case on the formula (24) is calculated such that:

$$l_{14}^2 = r_{14}^2$$

Assuming that $L=|r_{14}|-|l_{14}|$, the position is corrected by an amount of:

$$w = L/|l_{14}|, [wx_4 \ wy_4 \ 0]^T$$

In addition, in the case on the formula (44):

$$k_2 = 4m_{14}^2 a_2^2 - k_1^2 = -m_{14}^4 + 2(a_2^2 + a_3^2 + d_4^2)m_{14}^2 - (a_2^2 - a_3^2 - d_4^2)^2$$

$k_2 = 0$ is set with:

$$m_{140}^2 = (a_2^2 + a_3^2 + d_4^2) \pm \sqrt{(a_2^2 + a_3^2 + d_4^2)^2 - (a_2^2 - a_3^2 - d_4^2)^2}$$
$$= (a_2^2 + a_3^2 + d_4^2) \pm \sqrt{\{a_2^2 + (a_3^2 + d_4^2)\}^2 - \{a_2^2 - (a_3^2 + d_4^2)\}^2}$$
$$= (a_2^2 + a_3^2 + d_4^2) \pm$$
$$\sqrt{\{a_2^4 + 2a_2^2(a_3^2 + d_4^2) + (a_3^2 + d_4^2)^4\} - \{a_2^4 - 2a_2^2(a_3^2 + d_4^2) + (a_3^2 + d_4^2)^4\}}$$
$$= (a_2^2 + a_3^2 + d_4^2) \pm 2a_2\sqrt{a_3^2 + d_4^2}$$

In case of:

$$m_{14}^2 > (a_2^2 + a_3^2 + d_4^2) + 2a_2\sqrt{a_3^2 + d_4^2}, \text{ as}$$

$$L = |m_{14}| - \sqrt{(a_2^2 + a_3^2 + d_4^2) + 2a_2\sqrt{a_3^2 + d_4^2}}$$

L is moved to approach the origin in the αz plane. If the correction has already been made in the formula (24), this correction makes the formula (24) unestablished again. In such a case, only the z-axis is corrected under $k_2=0$. Further, in case of:

$$m_{14}^2 < (a_2^2 + a_3^2 + d_4^2) - 2a_2\sqrt{a_3^2 + d_4^2}, \text{ as}$$

$$L = \sqrt{(a_2^2 + a_3^2 + d_4^2) - 2a_2\sqrt{a_3^2 + d_4^2}} - |m_{14}|$$

L is moved away from the origin in the αz plane.

When it is determined at step S42 that the position is within the motion range and the step S34 is executed, the inverse transform process is then performed (step S43). In this process, $g^{-1}(T', F)$ is a function for calculating an angle of $\theta'=[\theta_1', \theta_2', \theta_3', \theta_4', \theta_5', \theta_5', \theta_6']^T$ based on the homogeneous transformation matrix T' and the form F of the robot 2, which are given under the condition d5=0.

At the next step, the angle θ' resulting from the inverse transform is subjected to the forward transform process (step S44), which provides a homogeneous transformation matrix T" and a form F". This homogeneous transformation matrix T" includes, as its components, a rotation matrix R" and a position matrix p".

A difference between a target position p and the obtained position p" is then obtained, and a position error vector $p_E$ is obtained. And the rotation matrix of the target position p is multiplied by an inverse vector of the rotation matrix R" so as to obtain a rotation vector $R_E$ for the evaluation (step S45). It is then determined whether or not the position error vector $p_E$ has a norm $\|P_E\|$ which is equal to or less than a threshold $P_{EM}$ (step S46), and it is further determined whether or not the rotation matrix $R_E$ has an angle $\|R_E\|$ which is equal to or less than a threshold $R_{EM}$ (step S47). The terms $\|p_E\|$ and $\|R_E\|$ are defined by formulae (*13) and (*14) which are as follows:

$$p_E = [\begin{array}{ccc} p_{Ex} & p_{Ey} & p_{Ez} \end{array}]^T, \|p_E\| = \sqrt{p_{Ex}^2 + p_{Ey}^2 + p_{Ez}^2} \quad (*13)$$

$$R_E = \begin{bmatrix} n_{Ex} & o_{Ex} & a_{Ex} \\ n_{Ey} & o_{Ey} & a_{Ey} \\ n_{Ez} & o_{Ez} & a_{Ez} \end{bmatrix}$$

$$\|R_E\| = \sin^{-1}\sqrt{\frac{(o_{Ez} - a_{Ey})^2 + (a_{Ex} - n_{Ex})^2 + (n_{Ey} - o_{Ex})^2}{2}} \quad (*14)$$
$$= \cos^{-1}\frac{n_{Ex} + o_{Ey} + a_{Ez} - 1}{2}$$

In response to the determination of YES at step S47, it is further determined whether or not a wrist form decided by the position p" and the rotation matrix R" corresponds to a designated wrist form (step S48). When the designated form is obtained, the inverse transform process is ended. Meanwhile, when it is determined NO at step S46 or S47, it is further determined the number of repeated execution times of both the inverse transform process and the forward transform process has exceeded a preterminal number (step S52). If the number of repeated execution times is equal to or over the predetermined number (YES at step S52), the process will be ended after countermeasure for an error are taken.

In contrast, when the number of repeated execution times are not over the predetermined number (NO at step S52), a rotation axis vector $q_E$ is calculated based on the normal, orientation, and approach vectors which are the elements of the rotation matrix $R_E$ (step S53).

$$q_E = \begin{bmatrix} \frac{o_{Ez} - a_{Ey}}{2} & \frac{a_{Ex} - n_{Ex}}{2} & \frac{n_{Ey} - o_{Ex}}{2} \end{bmatrix}^T \quad (*15)$$

A rotation vector $r_E$, which is a product of the angle $\|R_E\|$ of the rotation matrix $R_E$ and a unit rotation axis vector $q_E/\|q_E\|$, is calculated (step S54).

$$r_E = \frac{\sin^{-1}\|q_E\|}{\|q_E\|} q_E \qquad (*16)$$

A position matrix $P_E$, which is calculated on the position matrix $p_E$ and the rotation vector $r_E$, is multiplied by an inverse matrix of Jacobian matrix J calculated based on the angels θ of the respective axes, which results from the inverse transform process. Using the multiplied results, the angles θ' are updated (step S55), before proceeding to step S44. The Jacobian matrix J is expressed by the formulae (87) to (99).

The, the determination at step S48 will now be detailed. As shown in FIG. 9, if there is provided a robot is provided with a third offset arm providing d5≠0, like those in the present embodiment, four wrist forms are maximally given at a single end-effector position, so that the angles of the sixth axis, which meet the evaluation conditions at step S49, are also four in a maximal number thereof. With consideration of this, the step S48 uses a Jacobian matrix J in order to uniquely decide a wrist form among the wrist forms obtained via the inverse transform process. The sixth-axis angles, whose maximum number is four, have boundaries, in which points dividing the boundaries should be singular points and the Jacobian matrix J has a determinant of zero at the singular points.

By combing the sis of the Jacobian matrix and the fourth-axis angle belonging to which of a range of −90 degrees to +90 degrees, a range of −180 degrees to −90 degrees, or a range of +90 degrees to +180 degrees, which are based on the convectional determining way, the forms of the wrist, which are FLIP+, FLIP−, NONFLIP+, NONFLIP−, which are thus four in a maximal number, can be determined from each other.

Specifically, in addition to the arm forms of RIGHTY and LEFTY and the elbow forms of ABOVE and BELOW, there are provided combinations with the wrist forms FLIP+, FLIP−, NONFLIP+, and NONFLIP−. Hence, at step S48, a determinant of a Jacobian matrix J is calculated.

It is then checked whether or not the signs of the calculated determinant are in accordance with the designated wrist form.

In the above-explained embodiment, in the same manner described before, the controller 3 controls the robot 2 provided with the 6-axis vertical articulated type of arm, in which the arm is provided with the third offset arm 8 which mutually connects the fourth and sixth axes and whose link has a length d5. The fifth axis is arranged at the third offset arm 8 and the shaft centers of both the fourth and sixth axes are parallel to each other. The controller 3 controls, as a control point, an end effector which is the head portion of the arm, in which a position and an orientation to which the control point is targeted are subjected to the inverse transform process to calculate the axes of the respective axes.

In addition, the controller 3 provisionally decide the position P6' of the sixth axis, and based on its provisionally decided position P6', decides the position P5' of the fifth axis. And, by the controller 3, it is determined whether both positions P5' and P6' are within a motion range obtained based on the link parameters of the robot 2. If those positions P5' and P6' are within the motion range, a homogeneous transformation matrix obtained those positions is then subjected to an inverse transform process provided that the link length d5 is set to be zero. The angles of the respective axes, which are from the inverse transform process, are then subjected to a forward transform process.

Furthermore, the controller 3 obtains a position error vector $p_E$ which is a difference between a target position of the control point and a position obtained from the forward transform process. The controller 3 also obtains a rotation matrix $R_E$ by multiplying a rotation matrix based on the target position by an inverse matrix of the rotation matrix obtained by the forward transform process. When the position error vector $p_E$ has a norm $\|p_E\|$ which exceeds a threshold or the rotation matrix $R_E$ gives an angle $\|R_E\|$ which exceeds a threshold, a rotation axis vector $q_E$ is calculated based on the normal, orientation and approach vectors which are elements of the rotation matrix $R_E$, and a rotation vector $r_E$, which is a product between the angle $\|R_E\|$ and a unit rotary axis vector $q_E/\|q_E\|$, is then calculated. A position matrix $P_E$ is calculated based on the position matrix $p_E$ and the rotation vector $r_E$. The angles θ' are updated based on results obtained by multiplying the position matrix $P_E$ by an inverse matrix on the Jacobian matrix J. this inverse matrix is obtained from the angles θ of the respective axes, which are given by the inverse transform process. This update step is followed by repeated processing starting from the foregoing forward inverse transform.

In the same manner as the previous embodiment, even in the present configuration of the robot 2 provided with the offset arm which mutually links the fourth and sixth axes and has a link length d5, it is possible to carry out the inverse transform process. Practically, by provisionally setting the sixth-axis angle, the inverse transform process can be applied. And matrixes $p_E$ and $R_E$, which are obtained by applying a forward transform process to the inverse-transformed results, are estimated to make the processing converge. Hence, the inverse transform process can be performed for the angle calculation.

Meanwhile, also in the same manner as that in the previous embodiment, when the positions P5' and P6' are not within the motion range, those positions P5' and P6' are corrected to shift those positions to the inside of the motion range. The position of the control point, which is decided on the homogeneous transformation matrix T', also undergoes the same way as the foregoing. That is, the control point position is determined to be within the motion range or not, and if not within the motion range, the homogeneous transformation matrix T' is corrected to make the control point position locate within the motion range. This enables the inverse transform process to be repeated continuously.

In the fifth embodiment, the same or similar advantageous operations as or to those gained in relation to calculating the wrist form based on the Jacobian matrix J in the first embodiment can be provided as well.

The foregoing embodiments may adopt a controller 3 installed in various parts of of the robot 2, which are other than the base 4.

PARTIAL REFERENCE SIGNS LIST

In the drawings:
1 robot system
2 robot
3 controller
4 base
5 shoulder
6 second offset arm
7 first arm
8 third offset arm
9 second arm 10 fifth offset arm
11 wrist
12 hand

What is claimed is:

1. A controller, applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes, the controller comprising:
    an angular provisional deciding unit configured to provisionally decide an angle of a sixth angle;
    a direction calculating unit configured to calculate a direction of the offset arm based on the provisionally decided angle of the sixth axis;
    a provisional target position calculating unit configured to calculate a provisional target position which is subtracted from a target position of the sixth axis by the link length d5;
    an inverse transform processing unit configured to apply an inverse transform process to the provisional target position in a state where the link length d5 is set to 0; and
    an estimation unit configured to repeat the processes starting from the provisional decision performed by the angular provisional deciding unit until a difference between an angle of the sixth axis, which is obtained by estimating a result from the inverse transform process based on an estimation function, and the provisionally decided angle of the sixth axis becomes equal to or less than a predetermined value.

2. The controller for the robot according to claim 1, wherein
    a third axis and the fourth axis have approach vectors which are described as a3 and a4, and
    the estimation unit is configured to set, as the estimation function, an inner product of a3×a4.

3. The controller for the robot according to claim 1, comprising
    a form deciding unit configured to decide a form of a wrist resulting from the inverse transform process by previously employing any of angles of the fourth to sixth axes to the same end effector position.

4. The controller for the robot according to claim 1, comprising
    a form deciding unit configured to decide a form of a wrist based on results of the inverse transform process, by calculating a determinant on a Jacobian matrix with the results of the inverse transform process and determining whether or not signs of the determinant are in accord with a previously designated wrist form.

5. An inverse transform processing method, applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes, the method comprising:
    a step configured to provisionally decide an angle of a sixth angle;
    a step configured to calculate a direction of the offset arm based on the provisionally decided angle of the sixth axis;
    a step configured to calculate a provisional target position which is subtracted from a target position of the sixth axis by the link length d5;
    a step configured to apply an inverse transform process to the provisional target position in a state where the link length d5 is set to 0; and
    a step configured to repeat the processes starting from the provisional decision until a difference between an angle of the sixth axis, which is obtained by estimating a result from the inverse transform process based on an estimation function, and the provisionally decided angle of the sixth axis becomes equal to or less than a predetermined value.

6. The inverse transform processing method of claim 5, wherein
    a third axis and the fourth axis have approach vectors which are described as a3 and a4, and
    the estimation function is set as an inner product of a3×a4.

7. The inverse transform processing method of claim 5, comprising
    deciding a form of a wrist resulting from the inverse transform process by previously employing any of angles of the fourth to sixth axes to the same end effector position.

8. The inverse transform processing method of claim 5, comprising
    deciding a form of a wrist based on results of the inverse transform process, by calculating a determinant on a Jacobian matrix with the results of the inverse transform process and determining whether or not signs of the determinant are in accord with a previously designated wrist form.

9. A controller, applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes, the controller comprising:
    a position provisional deciding unit configured to provisionally decide a position P6' of the sixth axis and provisionally decide a position P5' of the fifth axis based on the provisionally decided position P6';
    a motion range determining unit configured to determine whether or not the provisionally decided positions P5' and P6' are within a motion range defined based on link parameters of the robot;
    an inverse transform processing unit configured to perform an inverse transform process of a homogeneous transformation matrix based on the positions P5' and P6' in a case where the provisionally decided positions P5' and P6' are within the motion range, the inverse transform process being performed under a condition that the link length d5=0;
    a forward transform processing unit configured to perform a forward transform process based on angles of the respective axes obtained by the inverse transform process;

an evaluation value calculating unit configured to calculate a position matrix $p_E$ of a difference between a target position of the control point and a position resulting from the forward transform process, and calculate a rotation matrix $R_E$ by multiplying a rotation matrix corresponding to the target position, by an inverse matrix of the rotation matrix resulting from the forward transform process; and a calculation repeating unit configured to repeatedly calculate processes starting from the inverse transform process, based on a homogeneous transformation matrix in which the position matrix $p_E$ and the rotation matrix $R_E$ are reflected, when the position matrix $p_E$ has a norm exceeding a threshold thereof or the rotation matrix $R_E$ has an angle exceeding a threshold thereof.

10. The controller for the robot according to claim 9, wherein the inverse transform processing unit is configured to positionally correct the positions P5' and P6' so to be within the motion range when the positions P5' and P6' are not within the motion range.

11. The controller for the robot according to claim 9, wherein
the calculation repeating unit is configured to determine whether or not the position of the control point decided based on the homogeneous transformation matrix is within the motion range, and correct the homogeneous transformation matrix such that the position of the control point is located within the motion range when the position of the control point is not within the motion range.

12. The controller for the robot according to claim 9, comprising:
a form deciding unit configured to calculate a determinant based on a Jacobian matrix depending on results of the inverse transform process, and decide a form of a wrist which results from the inverse transform process, by determining whether or not signs of the determinant are in accord with a previously designated form of the wrist.

13. An inverse transform processing method, applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes, the method comprising:
a step configured to provisionally decide a position P6' of the sixth axis and provisionally decide a position P5' of the fifth axis based on the provisionally decided position P6';
a step configured to determine whether or not the provisionally decided positions P5' and P6' are within a motion range defined based on link parameters of the robot;
a step configured to perform an inverse transform process of a homogeneous transformation matrix based on the positions P5' and P6' in a case where the provisionally decided positions P5' and P6' are within the motion range, the inverse transform process being performed under a condition of the link length d5=0;
a step configured to perform a forward transform process based on angles of the respective axes obtained by the inverse transform process;

a step configured to calculate a position matrix $p_E$ of a difference between a target position of the control point and a position resulting from the forward transform process, and calculate a rotation matrix RE by multiplying a rotation matrix corresponding to the target position, by an inverse matrix of the rotation matrix resulting from the forward transform process; and a step configured to repeatedly calculate processes starting from the inverse transform process, based on a homogeneous transformation matrix in which the position matrix $p_E$ and the rotation matrix $R_E$ are reflected, when the position matrix $p_E$ has a norm exceeding a threshold thereof or the rotation matrix $R_E$ has an angle exceeding a threshold thereof.

14. The inverse transform processing method according to claim 13, wherein
the inverse transform processing step positionally corrects the positions P5' and P6' so to be within the motion range when the positions P5' and P6' are not within the motion range.

15. The inverse transform processing method according to claim 13, wherein
the calculation repeating step determines whether or not the position of the control point decided based on the homogeneous transformation matrix is within the motion range, and corrects the homogeneous transformation matrix such that the position of the control point is located within the motion range when the position of the control point is not within the motion range.

16. The inverse transform processing method according to claim 13, comprising
a step configured to calculate a determinant based on a Jacobian matrix depending on results of the inverse transform process, and decide a form of a wrist which results from the inverse transform process, by determining whether or not signs of the determinant are in accord with a previously designated form of the wrist.

17. A controller, applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes, the controller comprising:
a position provisional deciding unit configured to provisionally decide a position P6' of the sixth axis and provisionally decide a position P5' of the fifth axis based on the provisionally decided position P6';
a motion range determining unit configured to determine whether or not the provisionally decided positions P5' and P6' are within a motion range defined based on link parameters of the robot;
an inverse transform processing unit configured to perform an inverse transform process of a homogeneous transformation matrix based on the positions P5' and P6' in a case where the provisionally decided positions P5' and P6' are within the motion range, the inverse transform process being performed under a condition of the link length d5=0;
a forward transform processing unit configured to perform a forward transform process based on angles of the respective axes obtained by the inverse transform process;

an evaluation value calculating unit configured to calculate a position matrix $p_E$ of a difference between a target position of the control point and a position resulting from the forward transform process, and calculate a rotation matrix $R_E$ by multiplying a rotation matrix corresponding to the target position, by an inverse matrix of the rotation matrix resulting from the forward transform process; and a calculation repeating unit configured to:

calculate a rotation axis vector $q_E$ of the rotation matrix $R_E$ when the position matrix $p_E$ has a norm $\|p_E\|$ exceeding a threshold thereof or the rotation matrix $R_E$ provides an angle $\|R_E\|$ exceeding a threshold thereof, calculate a rotation vector $r_E$ defined as a product between the angle $\|R_E\|$ and a unit rotation axis vector $q_E/\|q_E\|$, and update the angles of the respective axes based on results obtained by multiplying a position matrix $P_E$ defined by the position matrix $p_E$ and the rotation vector $r_E$, by an inverse matrix of the Jacobian matrix obtained from the angels of the respective axes calculated by the inverse transform process, processes starting from the forward transform process being repeated.

18. The controller for the robot according to claim 17, wherein the inverse transform processing unit is configured to positionally correct the positions P5' and P6' so to be within the motion range when the positions P5' and P6' are not within the motion range.

19. The controller for the robot according to claim 17, comprising:

a form deciding unit configured to calculate a determinant based on a Jacobian matrix depending on results of the inverse transform process, and decide a form of a wrist which results from the inverse transform process, by determining whether or not signs of the determinant are in accord with a previously designated form of the wrist.

20. An inverse transform processing method, applied to a robot provided with a vertical 6-axis articulated arm having an offset arm, the offset arm being provided with a fifth axis, linking a fourth axis and a sixth axis with each other, and having a link length d5, the fourth axis having a shaft center and the sixth axis having a shaft center, both of the shaft centers being parallel with each other, the arm having a head portion designated as a control point, a position and an orientation targeted to the control point being processed by an inverse transform in order to calculate an angle of each of the axes, the method comprising:

a step configured to provisionally decide a position P6' of the sixth axis and provisionally decide a position P5' of the fifth axis based on the provisionally decided position P6';

a step configured to determine whether or not the provisionally decided positions P5' and P6' are within a motion range defined based on link parameters of the robot;

a step configured to perform an inverse transform process of a homogeneous transformation matrix based on the positions P5' and P6' in a case where the provisionally decided positions P5' and P6' are within the motion range, the inverse transform process being performed under a condition of the link length d5=0;

a step configured to perform a forward transform process based on angles of the respective axes obtained by the inverse transform process;

a step configured to calculate a position matrix $p_E$ of a difference between a target position of the control point and a position resulting from the forward transform process, and calculate a rotation matrix $R_E$ by multiplying a rotation matrix corresponding to the target position, by an inverse matrix of the rotation matrix resulting from the forward transform process; and a step configured to:

calculate a rotation axis vector $q_E$ of the rotation matrix $R_E$ when the position matrix $p_E$ has a norm $\|p_E\|$ exceeding a threshold thereof or the rotation matrix RE provides an angle $\|R_E\|$ exceeding a threshold thereof, calculate a rotation vector $r_E$ defined as a product between the angle $\|R_E\|$ and a unit rotation axis vector $q_E/\|q_E\|$, and update the angles of the respective axes based on results obtained by multiplying a position matrix $P_E$ defined by the position matrix $p_E$ and the rotation vector $r_E$, by an inverse matrix of the Jacobian matrix obtained from the angels of the respective axes calculated by the inverse transform process, processes starting from the forward transform process being repeated.

21. The inverse transform processing method according to claim 20, wherein the inverse transform processing step positionally corrects the positions P5' and P6' so to be within the motion range when the positions P5' and P6' are not within the motion range.

22. The inverse transform processing method according to claim 20 comprising a step configured to calculate a determinant based on a Jacobian matrix depending on results of the inverse transform process, and decide a form of a wrist which results from the inverse transform process, by determining whether or not signs of the determinant are in accord with a previously designated form of the wrist.

* * * * *